US010692536B1

(12) United States Patent
Johnson

(10) Patent No.: US 10,692,536 B1
(45) Date of Patent: Jun. 23, 2020

(54) GENERATION AND USE OF MULTICLIPS IN VIDEO EDITING

(71) Applicant: Apple Inc., Cupertino, CA (US)

(72) Inventor: Gary Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 467 days.

(21) Appl. No.: 15/268,589

(22) Filed: Sep. 18, 2016

Related U.S. Application Data

(63) Continuation of application No. 11/107,330, filed on Apr. 16, 2005, now abandoned.

(51) Int. Cl.
| | |
|---|---|
| *H04N 5/93* | (2006.01) |
| *G11B 27/036* | (2006.01) |
| *G11B 27/30* | (2006.01) |
| G11B 27/00 | (2006.01) |
| G06F 3/0482 | (2013.01) |

(52) U.S. Cl.
CPC .......... *G11B 27/036* (2013.01); *G11B 27/30* (2013.01); *G06F 3/0482* (2013.01)

(58) Field of Classification Search
USPC .......................... 386/223–227, 248, 278–290
See application file for complete search history.

(56) References Cited

U.S. PATENT DOCUMENTS

| | | | |
|---|---|---|---|
| 5,404,316 A | 4/1995 | Klingler et al. | |
| 5,519,828 A | 5/1996 | Rayner | |
| 5,659,792 A | 8/1997 | Walmsley | |
| 5,659,793 A | 8/1997 | Escobar et al. | |
| 5,682,326 A | 10/1997 | Klingler et al. | |
| 5,732,184 A | 3/1998 | Chao et al. | |
| 5,850,352 A * | 12/1998 | Moezzi | G06T 15/10 345/419 |
| 5,926,603 A | 7/1999 | Tanaka et al. | |
| 5,969,716 A | 10/1999 | Davis et al. | |
| 6,144,375 A | 11/2000 | Jain et al. | |
| 6,188,396 B1 | 2/2001 | Boezeman et al. | |
| 6,246,402 B1 * | 6/2001 | Setogawa | G11B 19/022 386/281 |
| 6,353,461 B1 | 3/2002 | Shore et al. | |
| 6,400,378 B1 | 6/2002 | Snook | |
| 6,404,978 B1 | 6/2002 | Abe | |

(Continued)

FOREIGN PATENT DOCUMENTS

GB    2387710    10/2003

OTHER PUBLICATIONS

U.S. Appl. No. 11/107,330, filed Apr. 16, 2005, Johnson, Gary.
Author Unknown, "Apple Announces Final Cut Pro 4," NAB, Apr. 6, 2003, 3 pages, Apple Inc., Las Vegas, USA.

*Primary Examiner* — Nigar Chowdhury
(74) *Attorney, Agent, or Firm* — Invoke

(57) ABSTRACT

Some embodiments of the invention provide a method of generating a composite video clip from several video clips. The method automatedly groups the video clips into sets of related video clips. It then uses the sets of related video clips to generate the composite video clip. In some embodiments, the method can group the video clips based on their start times. For instance, the method can group video clips that start within a certain temporal offset of each other as a related set of video clips. Also, in some embodiments, the method can group video clips that overlap with each other by a required threshold amount as a related set of video clips.

21 Claims, 20 Drawing Sheets

(56) References Cited

U.S. PATENT DOCUMENTS

| | | |
|---|---|---|
| 6,414,686 B1 | 7/2002 | Protheroe et al. |
| 6,469,718 B1* | 10/2002 | Setogawa ............. G06F 3/0482 348/E5.105 |
| 6,515,656 B1 | 2/2003 | Wittenburg et al. |
| 6,624,846 B1* | 9/2003 | Lassiter ............... G06F 3/04815 348/211.4 |
| 6,642,939 B1 | 11/2003 | Vallone et al. |
| 6,760,538 B1 | 7/2004 | Bumgardner et al. |
| 6,888,999 B2 | 5/2005 | Herberger et al. |
| 7,006,154 B2 | 2/2006 | Dudkowski |
| 7,015,954 B1* | 3/2006 | Foote ................... G06T 3/4038 348/218.1 |
| 7,073,127 B2 | 7/2006 | Zhao et al. |
| 7,200,656 B1* | 4/2007 | Cousins ................ H04L 43/045 370/230.1 |
| 7,313,755 B2 | 12/2007 | Rahman et al. |
| 7,398,002 B2* | 7/2008 | Hsiao .................. G11B 27/034 345/473 |
| 7,467,400 B1* | 12/2008 | Moss ...................... G07C 9/38 726/3 |
| 7,565,060 B2* | 7/2009 | Hamada ............... G11B 27/034 386/248 |
| 7,631,261 B2* | 12/2009 | Williams ................ G06T 15/20 345/427 |
| 7,823,056 B1 | 10/2010 | Davey et al. |
| 8,006,186 B2* | 8/2011 | Kellock ................ G11B 27/34 715/721 |
| 8,020,100 B2 | 9/2011 | Ubillos et al. |
| 8,954,477 B2 | 2/2015 | Agnoli et al. |
| 9,111,579 B2 | 8/2015 | Meaney et al. |
| 9,437,247 B2 | 9/2016 | Pendergast et al. |
| 2001/0020953 A1 | 9/2001 | Moriwake et al. |
| 2002/0001449 A1* | 1/2002 | Sato .................... A63B 24/0006 386/207 |
| 2002/0154156 A1 | 10/2002 | Moriwake et al. |
| 2002/0174430 A1* | 11/2002 | Ellis ..................... G11B 27/005 725/46 |
| 2002/0194038 A1* | 12/2002 | Sauser .................. G06Q 10/02 705/5 |
| 2003/0112354 A1* | 6/2003 | Ortiz ....................... H04N 7/18 348/333.01 |
| 2003/0164925 A1* | 9/2003 | Kutner ..................... E04H 3/22 352/6 |
| 2003/0189589 A1* | 10/2003 | LeBlanc ............... G11B 27/031 715/723 |
| 2004/0032495 A1* | 2/2004 | Ortiz ...................... H04N 5/232 348/157 |
| 2004/0125133 A1* | 7/2004 | Pea ......................... G06Q 10/10 715/751 |
| 2004/0143602 A1* | 7/2004 | Ruiz ..................... G08B 13/122 |
| 2004/0179816 A1 | 9/2004 | Takehana |
| 2004/0239763 A1* | 12/2004 | Notea .................... H04N 5/222 348/169 |
| 2004/0268224 A1 | 12/2004 | Balkus et al. |
| 2005/0220361 A1* | 10/2005 | Yamasaki ........... G06K 9/00785 382/284 |
| 2006/0041589 A1* | 2/2006 | Helfman ............... G06F 16/958 |
| 2006/0150100 A1 | 7/2006 | Braun et al. |
| 2010/0183280 A1 | 7/2010 | Beauregard et al. |
| 2010/0278504 A1 | 11/2010 | Lyons et al. |
| 2010/0281372 A1 | 11/2010 | Lyons et al. |
| 2010/0281377 A1 | 11/2010 | Meaney et al. |
| 2010/0281382 A1 | 11/2010 | Meaney et al. |
| 2010/0281386 A1 | 11/2010 | Lyons et al. |
| 2013/0124999 A1 | 5/2013 | Agnoli et al. |
| 2013/0125000 A1 | 5/2013 | Fleischhauer et al. |

\* cited by examiner

FIG. 13

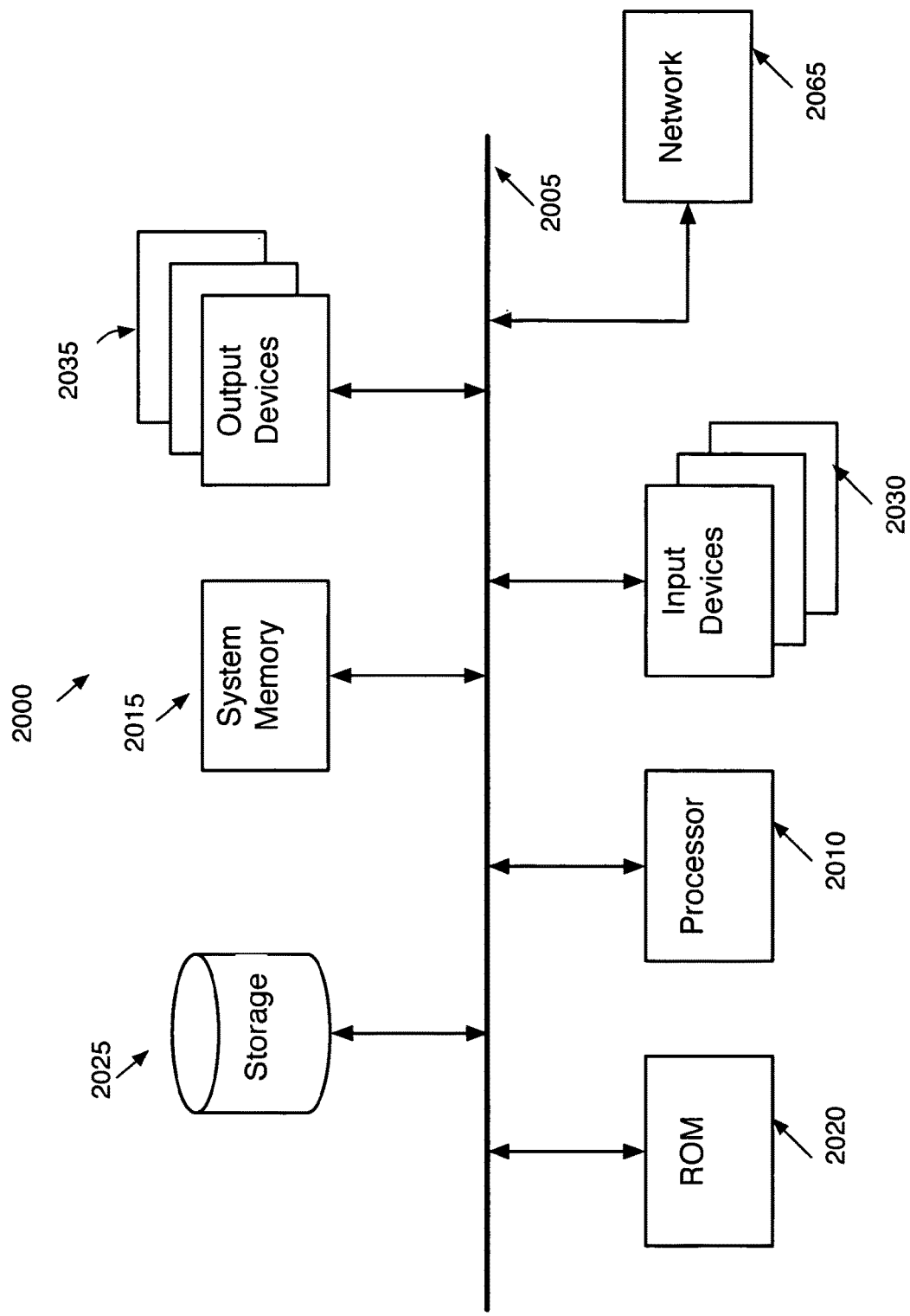

GENERATION AND USE OF MULTICLIPS IN VIDEO EDITING

CLAIM OF BENEFIT TO PRIOR APPLICATIONS

This Application is a continuation application of U.S. patent application Ser. No. 11/107,330, filed Apr. 16, 2005. U.S. patent application Ser. No. 11/107,330 is incorporated herein by reference.

FIELD OF THE INVENTION

The invention is directed towards generation and use of multiclips in video editing.

BACKGROUND OF THE INVENTION

In recent years, there has been a proliferation of video editing applications. These applications provide numerous editing tools that allow a user to create composite video presentations by combining one or more video and audio tracks and applying one or more video and/or audio effects to these tracks.

Most video editing applications do not provide a robust set of tools for multi-camera editing, i.e., for editing video clips from an event that has been captured by multiple cameras. This is a serious deficiency in many video-editing applications as the number of events that are captured by multiple cameras is increasing. Examples of such events include sporting events, concerts, music videos, reality shows, etc. Therefore, there is a need in the art for robust video editing tools that allow a video editor to easily perform multi-camera editing. Ideally, such editing tools will be seamlessly integrated with other video editing tools in a video editing application.

SUMMARY OF THE INVENTION

Some embodiments of the invention provide a method of generating a composite video clip from several video clips. The method automatedly groups the video clips into sets of related video clips. It then uses the sets of related video clips to generate the composite video clip. In some embodiments, the method can group the video clips based on their start times. For instance, the method can group video clips that start within a certain temporal offset of one another as a related set of video clips. Also, in some embodiments, the method can group video clips that overlap with each other by a required threshold amount as a related set of video clips.

BRIEF DESCRIPTION OF THE DRAWINGS

The novel features of the invention are set forth in the appended claims. However, for purpose of explanation, several embodiments of the invention are set forth in the following figures.

FIG. 4 illustrates a window that opens up when the user selects the option of importing a folder, while

FIG. 13 illustrates an entry for a multiclip sequence in a browser window of a video editing application.

FIG. 18 shows a video composite being the active video clip of one multiclip before the time when two multiclips overlap, while

FIG. 20 presents a computer system with which one embodiment of the invention is implemented.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Overview

Some embodiments of the invention provide a method of generating a composite video clip from several video clips. The method automatedly groups the video clips into sets of related video clips. It then uses the sets of related video clips to generate the composite video clip. In some embodiments, the method can group the video clips based on their start times. For instance, the method can group video clips that start within a certain temporal offset of one another as a related set of video clips. Also, in some embodiments, the method can group video clips that overlap with each other by a required threshold amount as a related set of video clips.

In some embodiments, the video clips that are automatedly grouped are video clips that are captured by multiple cameras during an event (such as a music video, sporting event, reality show, etc.). Hence, in these embodiments, the invention facilitates multi-camera editing by automatedly grouping video clips captured by the multiple cameras. Each grouped video clip is referred to as a multiclip in the discussion below. An editor can easily generate a composite video clip for the event by defining different parts of the clips in the same or different multiclips to be different parts of the composite video clip.

Even though the invention is particularly useful for multi-camera editing, it is also useful to other video editing contexts. For instance, the invention can be used to generate composite video clips from video clips that are all not from the same event. Also, even in the multi-camera editing context, one or more of the automatically grouped video clips might be edited before their grouping into multiclips.

Accordingly, as used below, a "video clip" can be a composite of one or more video sources, one or more audio tracks, and one or more video and audio effects. A video clip includes a number of frames, which are typically presented at a particular frame rate (e.g., at 25 fps, 30 fps, 60 fps). At times, each frame is presented in terms of two consecutive fields (e.g., is presented at 50 or 60 fields per second for a 25 or 30 fps video clip).

II. Graphical User Interface

Figure 1:
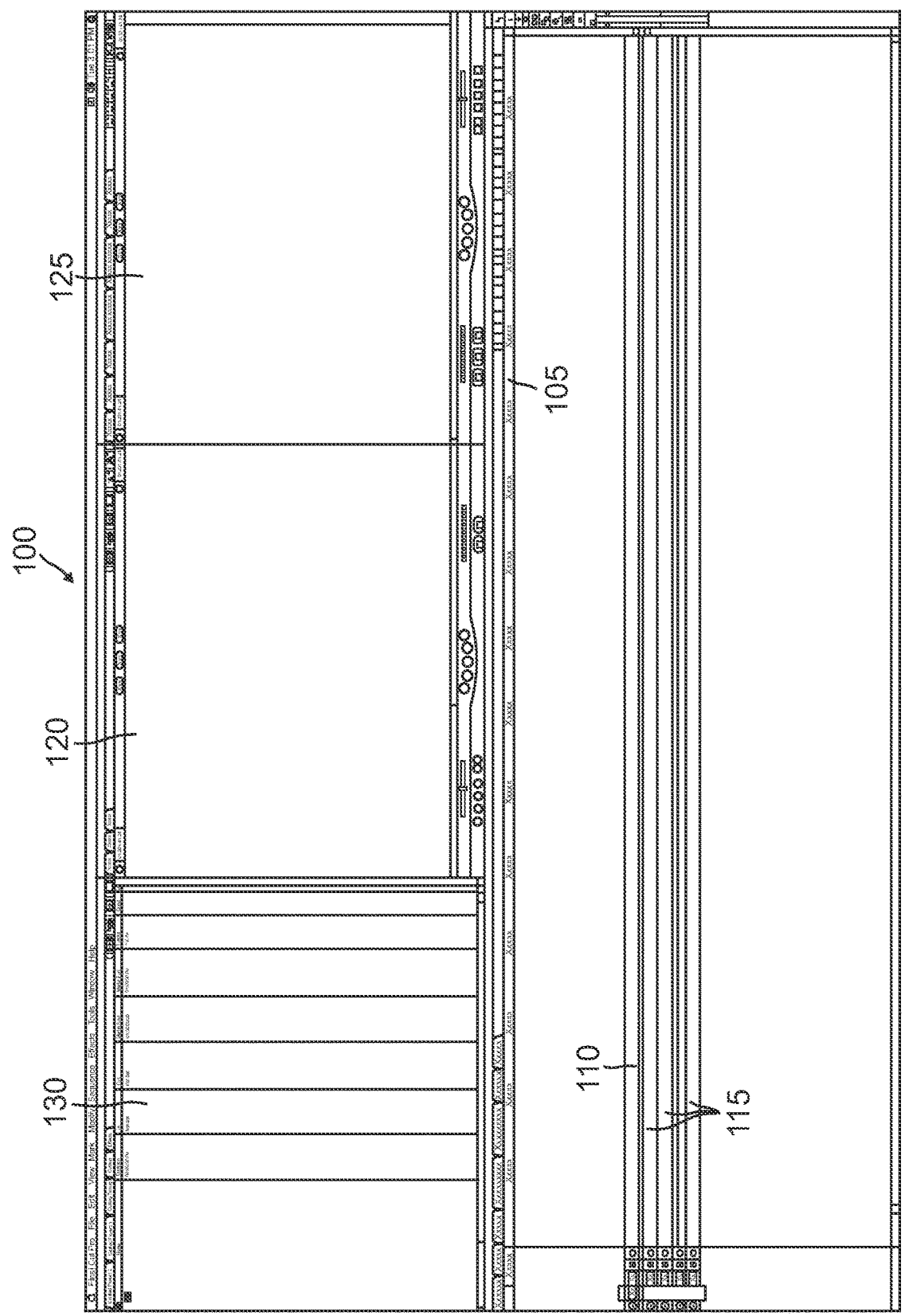
FIG. 1 illustrates the graphical user interface of the video editing application that implements some embodiments of the invention.

Some embodiments of the invention are implemented by a video editing application that has a graphical user interface ("GUI") 100 that is illustrated in FIG. 1. The video editor can interact with the GUI 100 through traditional GUI operations, such as click operations (e.g., to select an item), click-and-drag operations (e.g., to move an item), etc. As shown in FIG. 1, the GUI 100 includes a playback timeline 105, several video and audio tracks 110 and 115, multiclip display sections 120, a composite-video preview section 125, and a browser section 130. The GUI also includes a time marker (not shown in FIG. 1), which moves along the playback timeline 105. As illustrated in FIGS. 15-19, which are described below, the time marker in some embodiments is formed by (1) a polygonal shape (e.g., a triangle) 1525 that moves along the playback timeline 105 and (2) a line that projects downwards from the polygonal shape and moves with the polygonal shape.

In the browser section 130, the video editing application lists individual and composite clips, as well as multiclips and multiclip sequences. The playback timeline 105 represents the time during the playback of video and audio clips. The GUI 100 illustrates video and audio clips as rectangular boxes on the video and audio tracks, which are defined in parallel to the playback timeline 105. During multiclip editing, video and audio clips of one or more multiclips are illustrated on the video and audio tracks, as further described below.

During playback, the GUI's time marker scrolls across the timeline and identifies the portion of the video and audio clips that are playing at any instance along the timeline. Specifically, the intersection of the time-marker line with a video clip or an audio clip identifies an image (e.g., a frame) in the video clip or a sample in the audio clip that is in the clip at the particular time specified by the position of the time marker on the timeline. An editor can also drag the time marker to a particular time on the timeline to view the video-clip frame or the audio-clip sample at that time.

The multiclip display sections 120 are for displaying one or more video clips during multiclip editing. Specifically, during multiclip editing, the display sections 120 display the video clips of a particular multiclip that is selected for display, as the time marker scrolls across the particular multiclip, as further described below. The composite-video preview section 125 provides a preview display of the composite video. For instance, at any particular time during the editing or playback of one or more video clips, the composite-video section 125 illustrates the frame in the composite video that is defined for the particular time.

III. Video Editing Process

Figure 2:
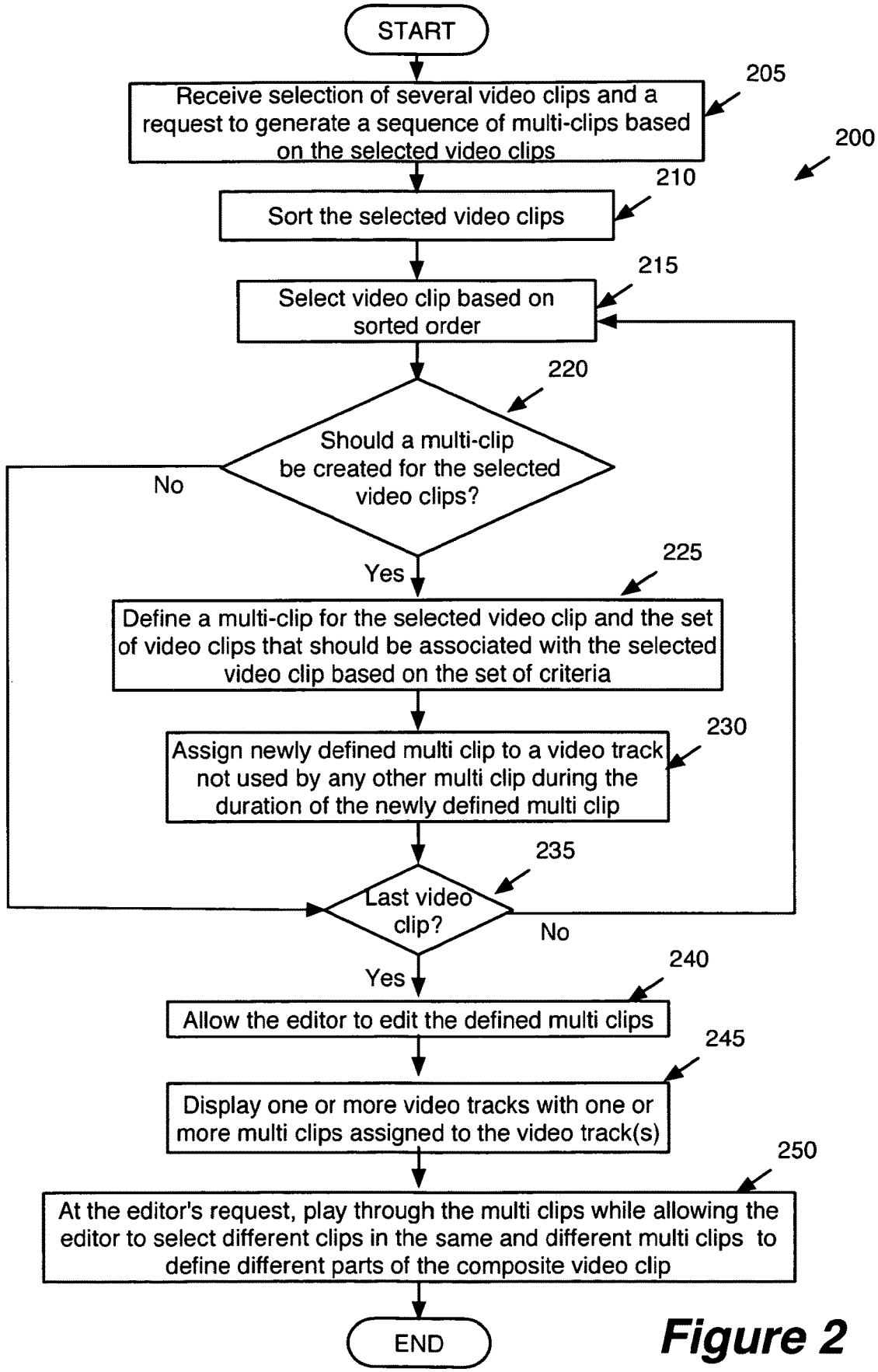
FIG. 2 conceptually illustrates a video editing process of some embodiments of the invention.

FIG. 2 conceptually illustrates a video editing process 200 of some embodiments of the invention. This process generates multiclips and displays these multiclips to a video editor, in order to simplify the generation of a composite video clip from several video clips. In some embodiments, a video editing application performs the video editing process 200. This process 200 will be described below by reference to FIGS. 3-19, which illustrate the graphical user interface 100 of the video editing application at different stages in the process 200.

Figure 3:
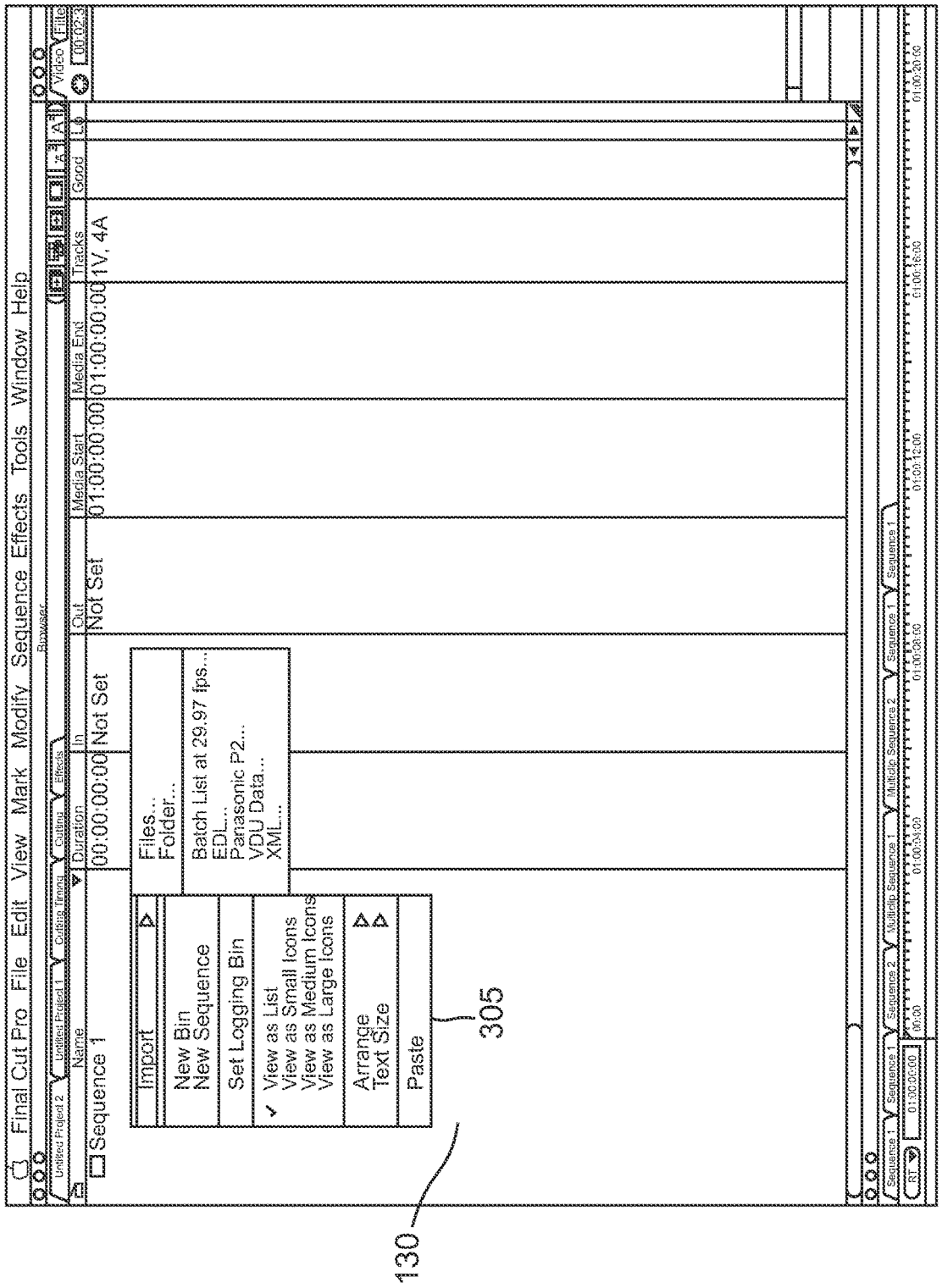
FIG. 3 illustrates the video editing application opening a drop down in the browser window

As shown in FIG. 2, the process 200 starts when it receives an editor's selection of several video clips and the editor's request to generate a sequence of multiclips based on the selected video clips. FIGS. 3-6 illustrates one way for an editor to perform such selection and request operations. Specifically, FIG. 3 illustrates the video editing application opening a drop down 305 in the browser window 130. In some embodiments, one way for a video editor to initiate such an opening is by performing standard GUI operations (e.g., a right-hand click operation in the browser window 130). FIG. 3 also illustrates the selection of the option in the drop down menu 305 to import files or folders into the browser window 305.

Figure 4:
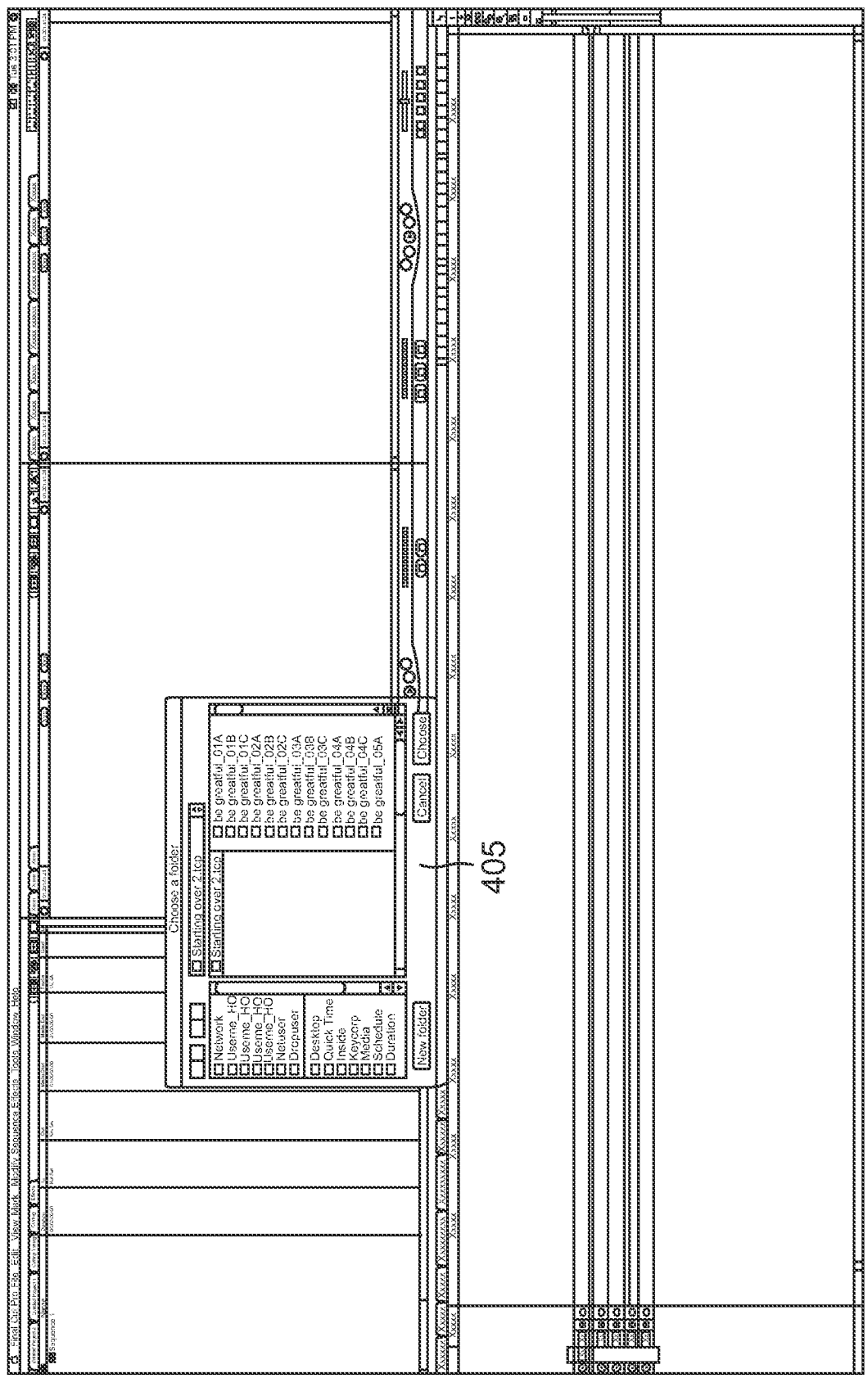
Figure 5:
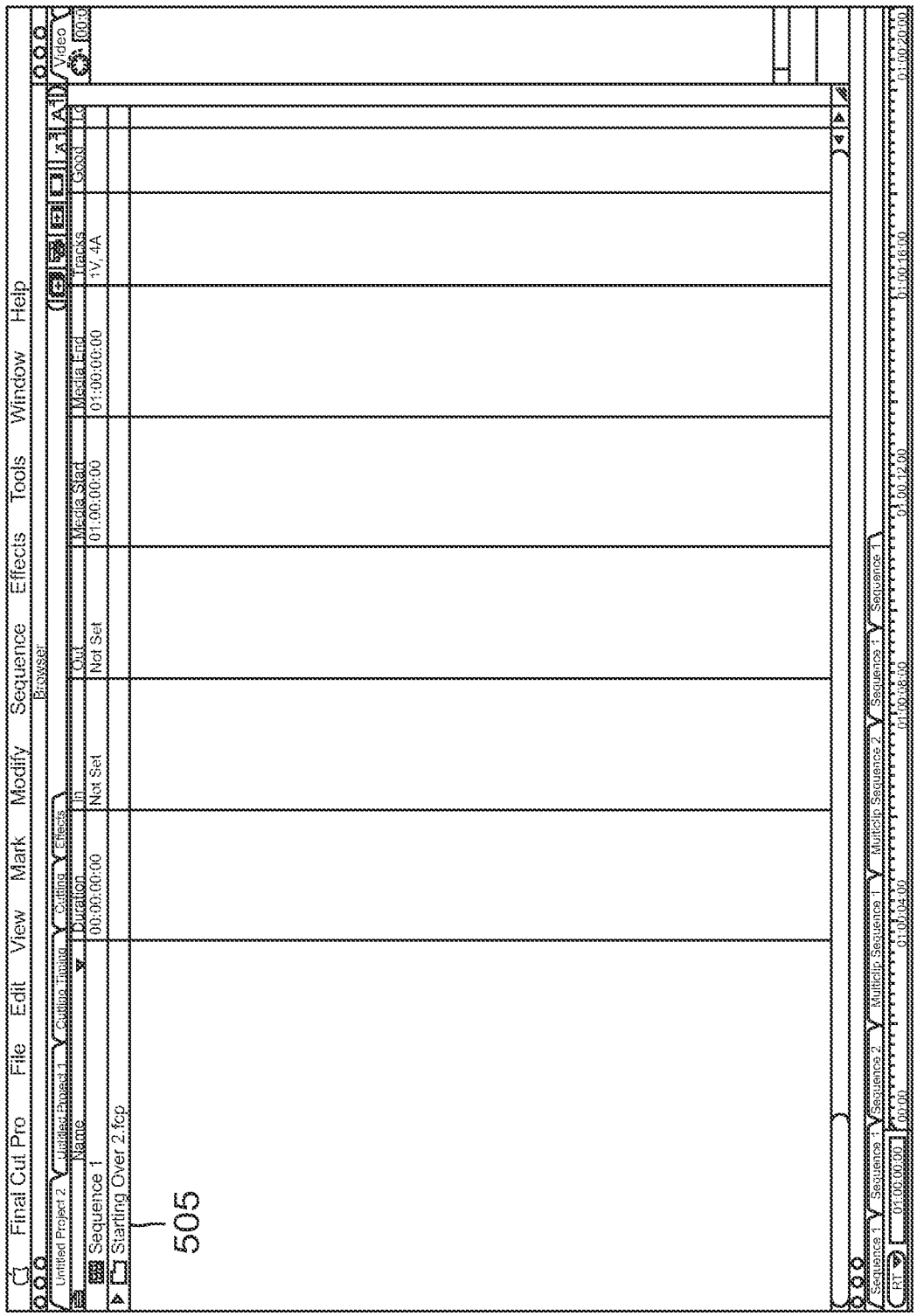
FIG. 5 illustrates the importing of a folder that was selected in the window.
Figure 6:
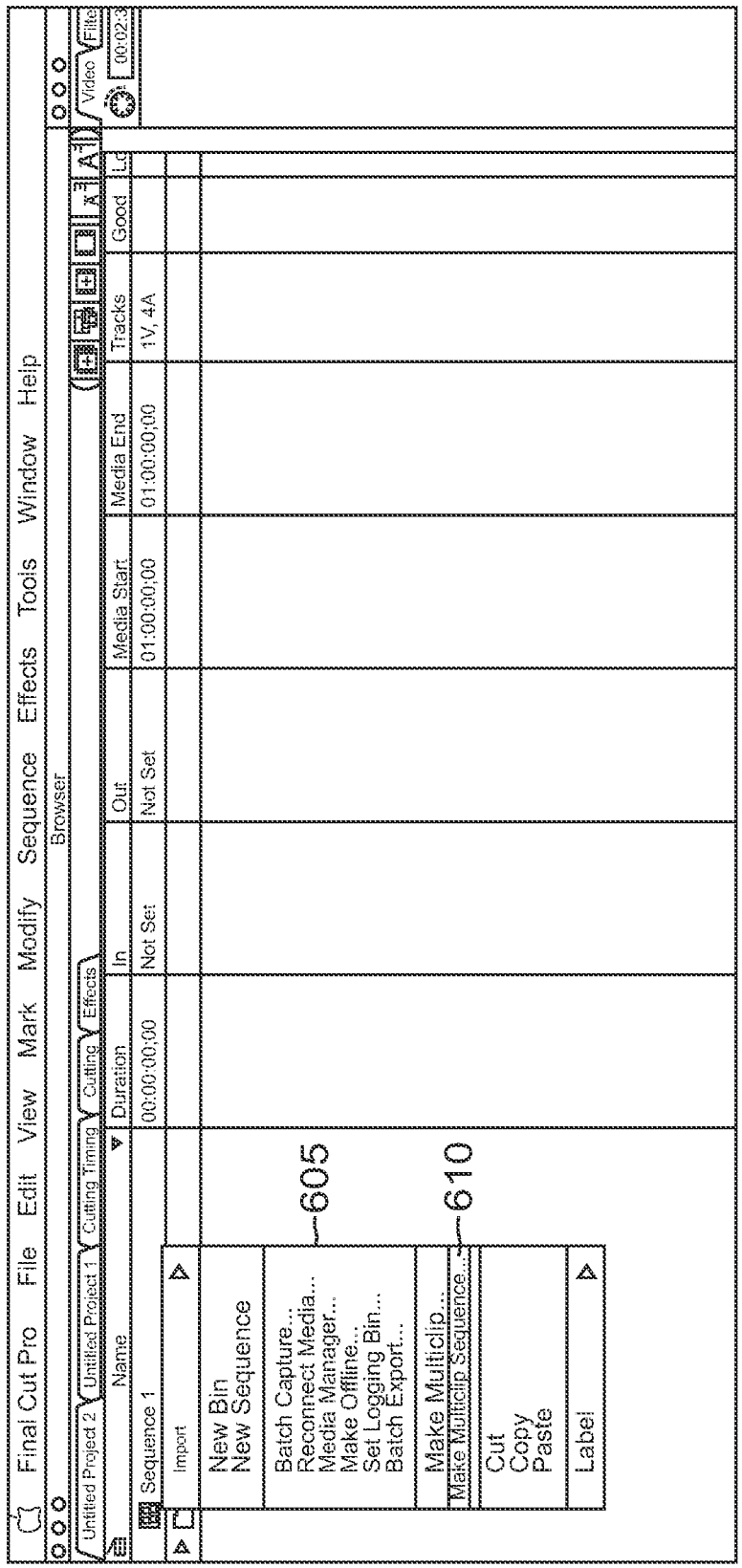
FIG. 6 illustrates the video editor making a request to generate a sequence of multiclips by selecting a "Make Multiclip Sequence" option in a drop down menu in the browser window.

FIG. 4 then illustrates a window 405 that opens up when the user selects the option of importing a folder, while FIG. 5 illustrates the importing of a folder 505 that was selected in the window 405. In the examples described below, it is assumed that the imported folder 505 includes video clips captured by multiple cameras at a single event. However, as mentioned above, the invention can be used even when the video clips are not all captured at the same event. FIG. 6 then illustrates the video editor making a request to generate a sequence of multiclips by selecting a "Make Multiclip Sequence" option 610 in a drop down menu 605 in the browser window, which the video editor can open through conventional GUI operations (such as a right-hand click operation), After 205, the process 200 sorts (at 210) the video clips that were selected at 205. In some embodiments, the process sorts the video clips based on their starting timecodes, which specify the start times of the video clips. Also, in some embodiments, the sorted order is an ascending order of starting timecodes (i.e., an order of the clip with the earliest timecode to the clip with the latest timecode).

Next, at 215, the process selects a video clip based on the order specified at 210. In its first iteration through 215, the process selects the first video clip in the specified order. In subsequent iterations through 215, the process selects the next video clip in the specified order. After 215, the process determines (at 220) whether it should define a multiclip for the video clip selected at 215. In some embodiments, the process needs to define (at 220) a multiclip for the selected video clip when (1) the video clip selected at 215 should be grouped with any other video clips selected at 205 and such a grouping has not been identified in a previous iteration through 220, or (2) the video clip should not be grouped with any other video clips selected at 205.

In some embodiments, the process uses (at 220) a set of matching criteria to determine whether two video clips should be grouped into a multiclip. In some embodiments, the video editing application allows the user to specify one of two criteria for the process 200 to use. One criterion is that two clips should be part of one multiclip when their starting timecodes is within a user-defined offset of each other. Another criterion is that two clips should be part of one multiclip when their durations overlap by a user-defined percentage of overlap.

FIGS. 7-11 illustrate how the video editing application of some embodiments allows the video editor to specify a criterion for defining multiclips. Specifically, after the video editor has selected the "Make Multiclip Sequence" option in FIG. 6, the video editing application presents a window that lists (1) one or more default multiclip selection criteria and their associated default set of parameter values, and (2) all the multiclips that can be generated for a set of video clips based on the default values.

Figure 7:
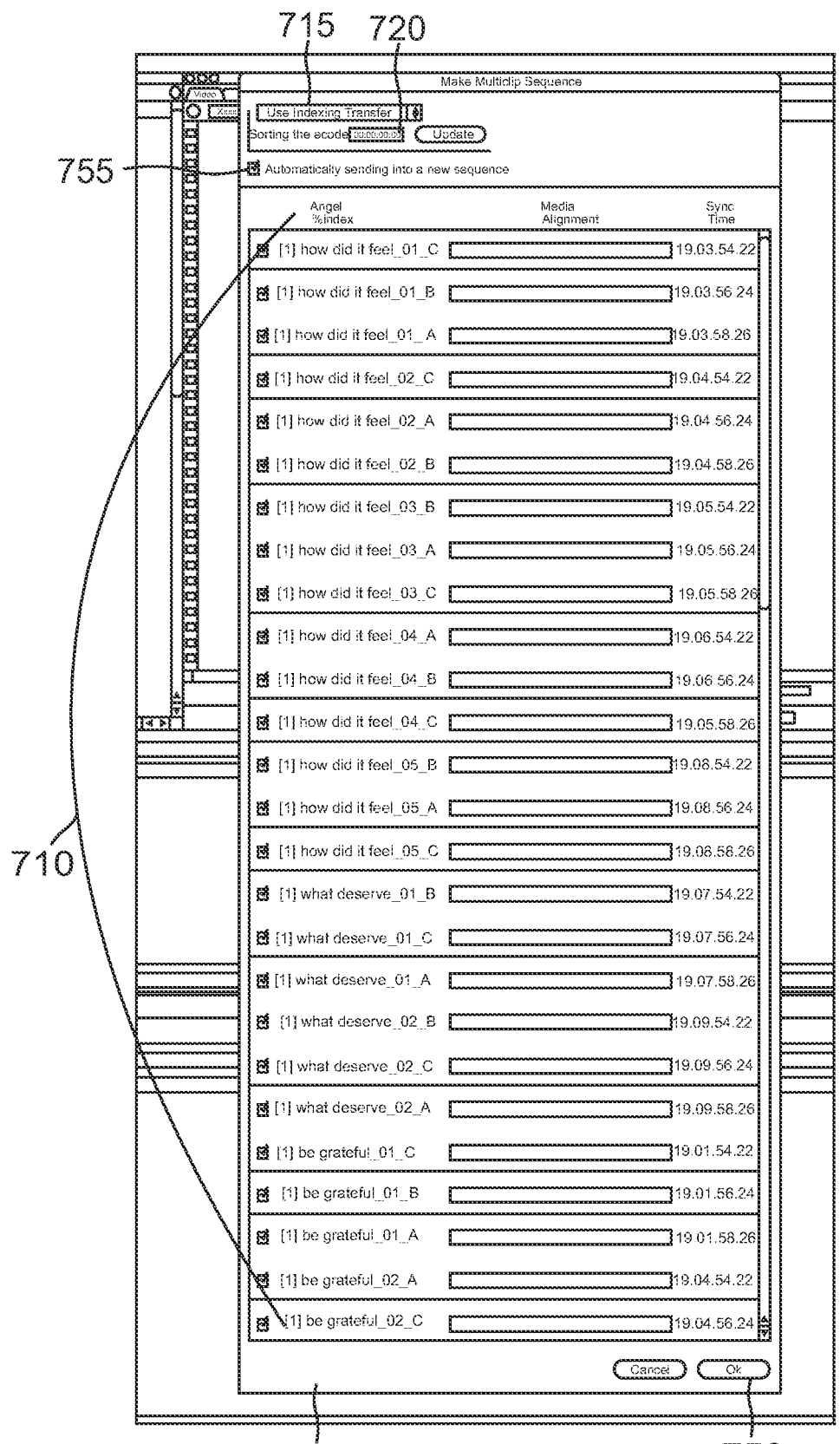
FIG. 7 illustrates an example of a multiclip listing.

FIG. 7 illustrates an example of such a window 705 with the multiclip listing 710 and default multiclip criterion 715. The default criterion illustrated in this figure is the starting timecodes of the set of video clips being considered. In field 720, this figure illustrates a default offset value of 0 for the starting timecodes. Consequently, each multiclip in the listing 710 include only one video clip each. In other words, given that no two video clips in the set of video clips have the same starting timecodes in this example, the zero-offset parameter value results in several multiclips, each with only one video clip.

Figure 8:
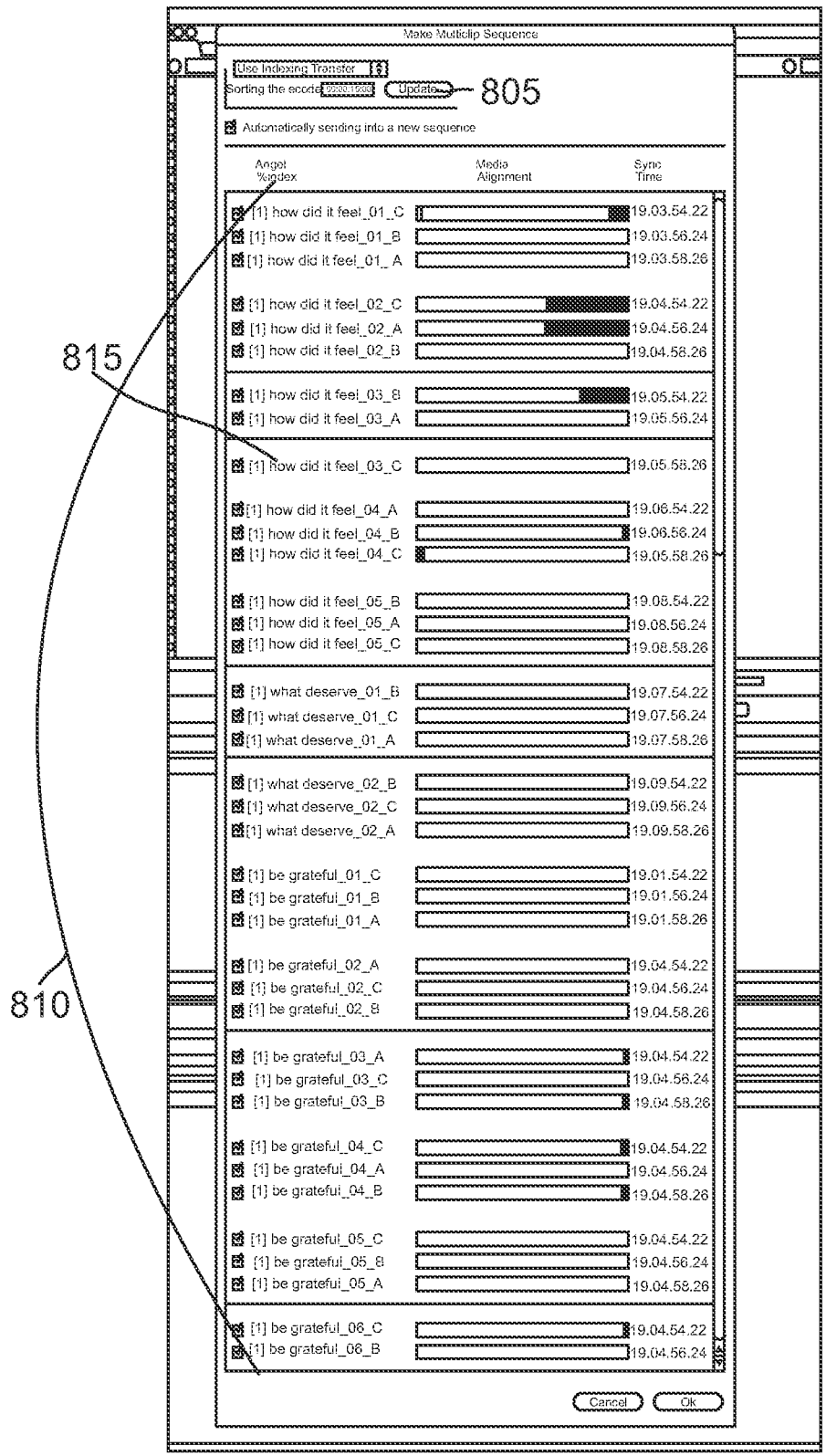
FIG. 8 illustrates the changing of an offset value used to group video clips.

In the window 705, the editor can change the matching criteria or the parameter values for these criteria. For instance, FIG. 8 illustrates the offset value being changed to 15 seconds in field 720. This change in combination with the selection (e.g., the clicking) of the update button 805, causes the video editing application to run the process 200 again for the new offset value. This iteration of the process 200 then generates a new set of multiclips, which are illustrated in list 810 of FIG. 8. The list 810 presents 14 multiclips, all having more than one video clip, with the exception of multiclip 815, which only has one video clip. Hence, the changing of the offset parameter value resulted in the grouping of several clips. One clip might appear in multiple groups, i.e., multiple multiclips.

Figure 9:
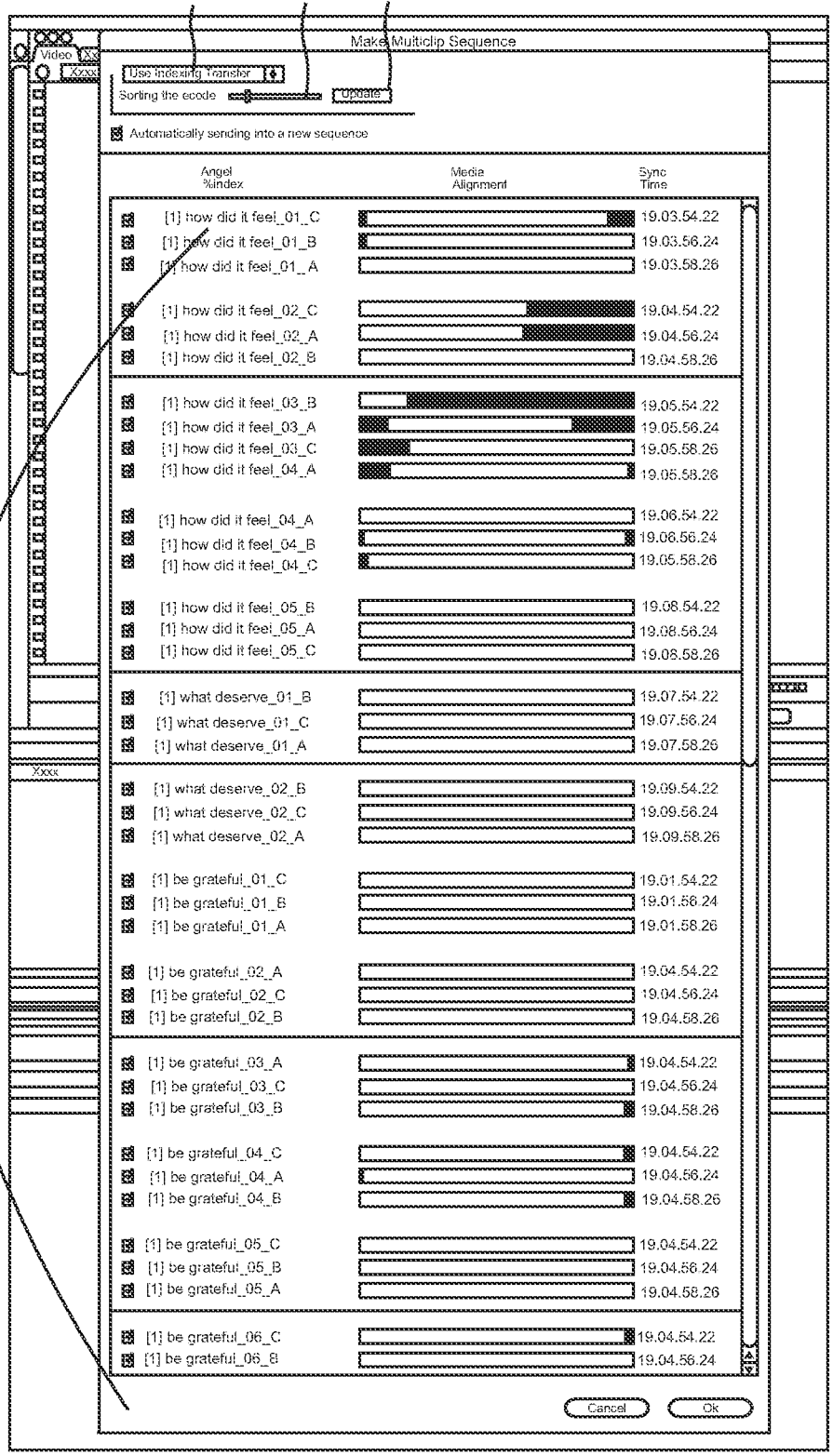
FIGS. 9-11 illustrate examples where the editor uses the overlap between the clips as the matching criterion.
Figure 10:
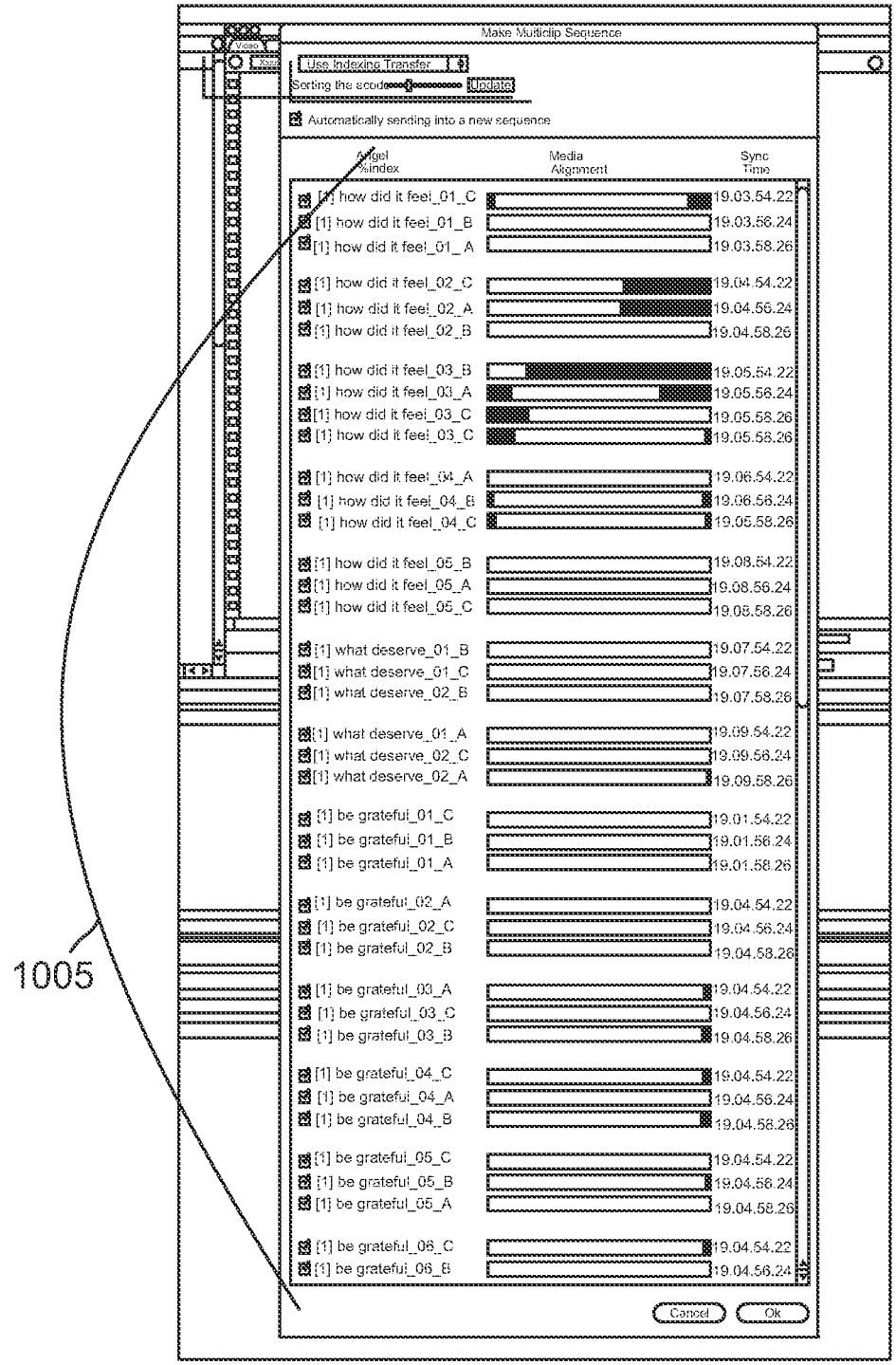
Figure 11:
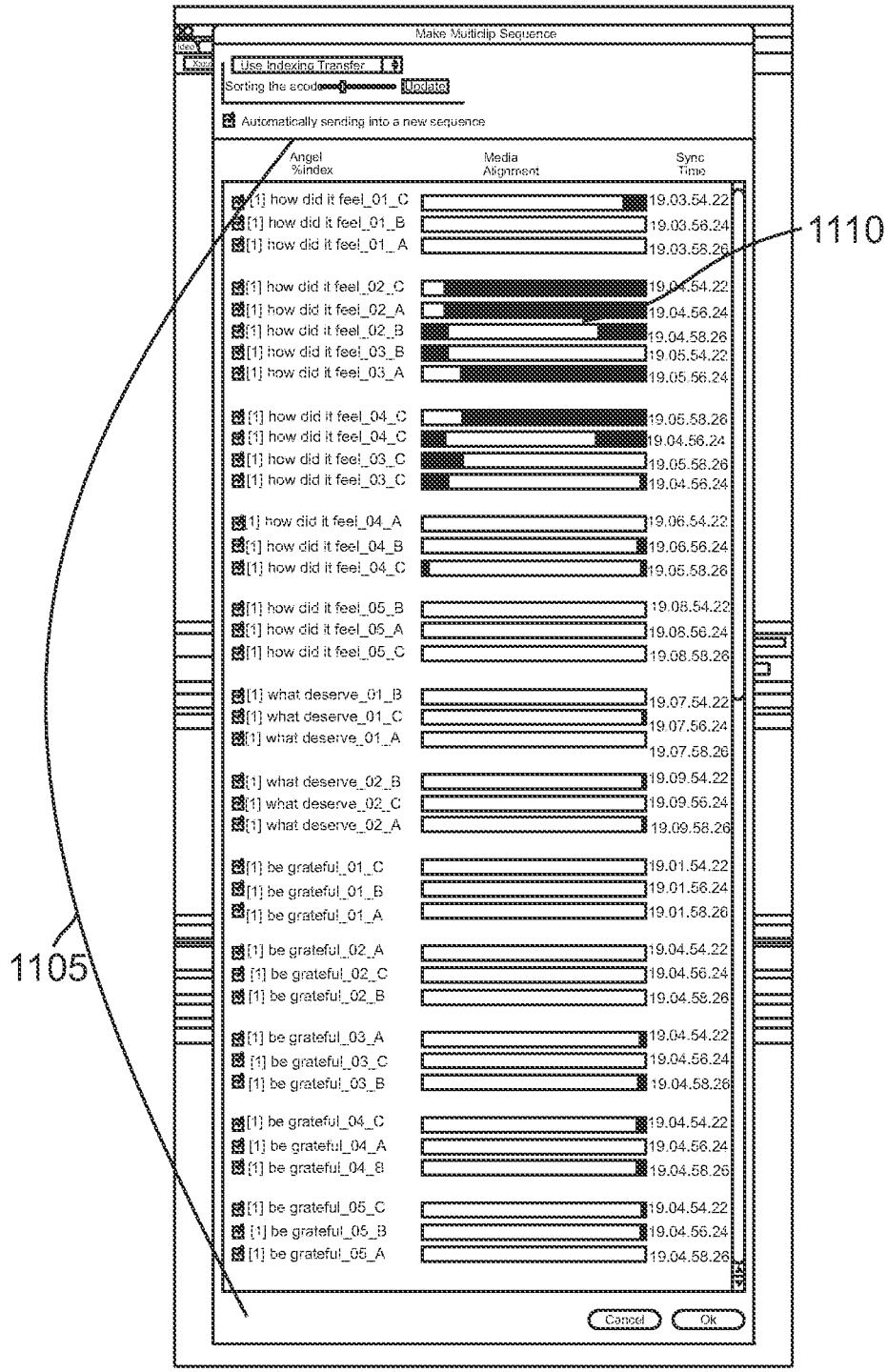

FIGS. 9-11 illustrate examples where the editor uses the overlap between the clips as the matching criterion. In some embodiments, the editor can change the matching criteria by selecting the drop-down menu 715. When this menu is selected (e.g., through a click operation), the menu opens up to reveal to matching criteria, one for the starting timecodes of the clips and the other for the overlap between the clips. In FIGS. 9-11, the editor has specified the overlap criterion. When the overlap criterion is selected, the offset field 720 is replaced by a scroll bar 905 and a field 910. A video editor can manipulate the scroll bar 905 (e.g., through a drag operation) or enter a value in the field 910, in order to specify a minimum required percentage of overlap between two clips of a multiclip.

In FIG. 9, the percentage of overlap is defined as fifteen percent. This percentage results a list 915 of multiclips that has thirteen multiclips, each with more than one video clip. This percentage is changed to thirty percent in FIG. 10. This change results in a list 1005 that has thirteen multiclips, each with more than one video clip. FIG. 11 then illustrates the changing of this percentage to five percent, and this change results in a list 1105 with twelve multiclips. The changing of the percentage value or the offset value may or may not result in the creation of new multiclips. For instance, changing the percentage overlap from thirty percent to five percent from FIG. 10 to FIG. 11 creates one large multiclip 1110 with five video clips. Also, as mentioned above, one video clip may be part of more than one multiclip.

Going back to FIG. 2, the process 200 transitions from 220 to 225, when it determines (at 220) that it should define a multiclip for the selected video clip at 215. As mentioned above, the process should define a multiclip for the selected video clip when (1) the video clip selected at 215 should be grouped with any other video clips selected at 205 and such a grouping has not been identified in a previous iteration through 220, or (2) the video clip should not be grouped with any other video clips selected at 205.

At 225, the process 200 defines a multiclip for the video clip selected at 215 and the set of video clips that should be grouped with the selected video clip based on the particular set of matching criteria used for grouping clips. When the process determines (at 220) that the selected video clip should not be grouped with any other video clips, the set of video clips that are grouped with the selected video clip in the multiclip created at 225 is an empty set of video clips.

Next, the process transitions from 225 to 230, where it assigns the newly defined multiclip to a video track not used by any other multiclip during the duration of the newly defined multiclip. After 230, the process transitions to 235. The process also transitions to 235 from 220 when it determines that it does not need to create a multiclip for the video clip selected at 225. In some embodiments, the process determines that it does not need to create a multiclip for the selected video clip when it determines that the selected video clip was part of a previously defined multiclip (s) and that it should not be part of any other multiclips based on the matching analysis performed at 220.

Figure 12:
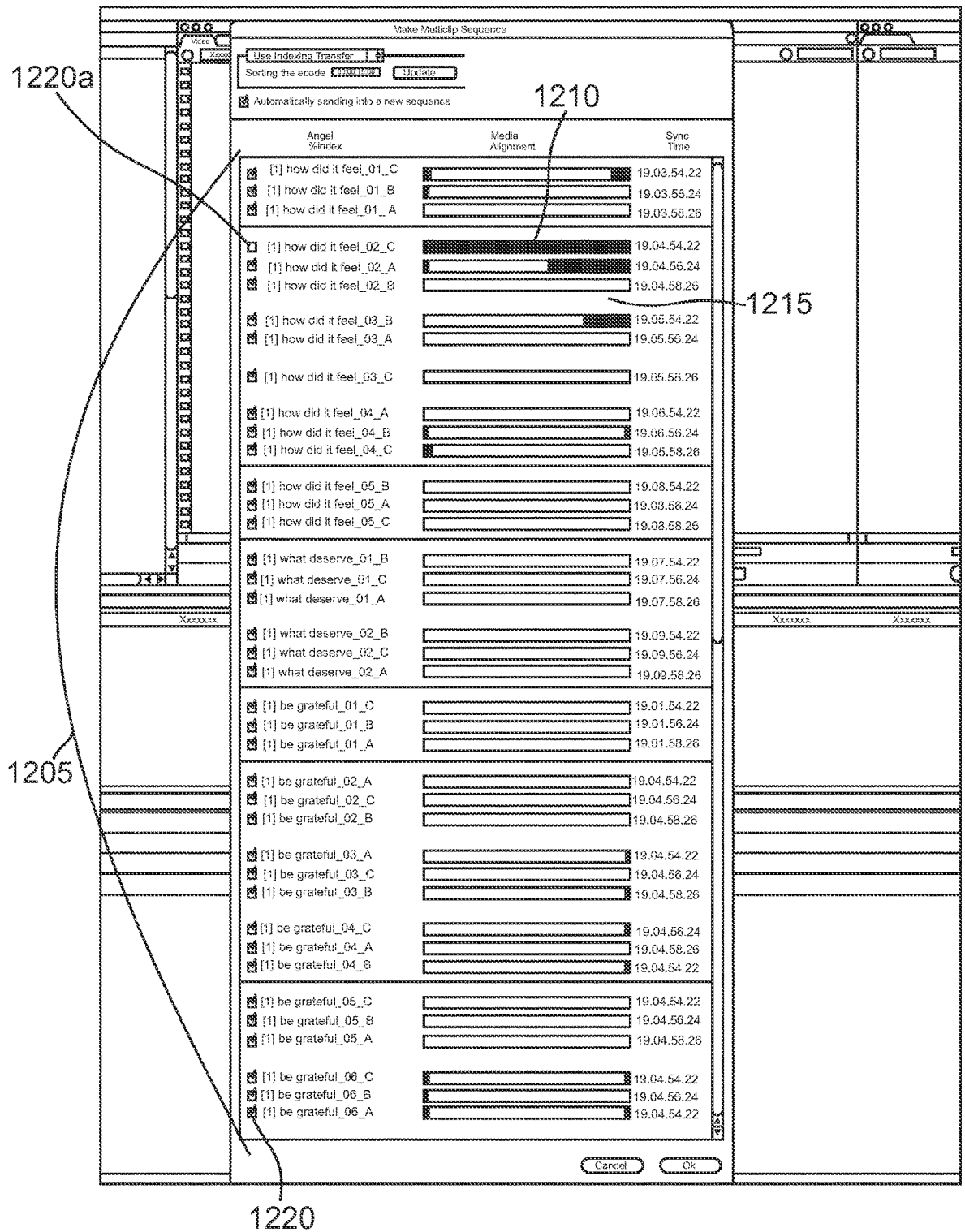
FIG. 12 illustrates an example of how a user can remove a clip from a multiclip.

At 235, the process determines whether it has examined all the video clips. If not, it returns to 215 to select the next video clip in the sorted order, and then repeats operations 220-235 for this video clip. When the process determines (at 235) that it has examined all the video clips, it presents (at 240) the multiclips to the video editor. At this stage, the video editor can edit the defined multiclips by adding or removing one or move video clips to each multiclip. FIG. 12 illustrates an example of such a removal. Specifically, it illustrates a list 1205 of multiclips. This list is identical to the list 805 of FIG. 8, except that one video clip 1210 in the multiclip 1215 has been dropped from this multiclip. In the lists 805 and 1205, a check box 1220 is placed next to each video clip name in the list. By default, each particular box is checked to indicate that the video clip associated with the particular box (i.e., the video clip whose name is in front of this box) is part of a multiclip. By removing the check from a particular box, the video editor can remove a video clip associated with the particular box from a multiclip. For instance, FIG. 12 illustrates the check box 1220a being unchecked, which indicates that the video clip 1210 has been dropped from the multiclip 1215.

Figure 13:
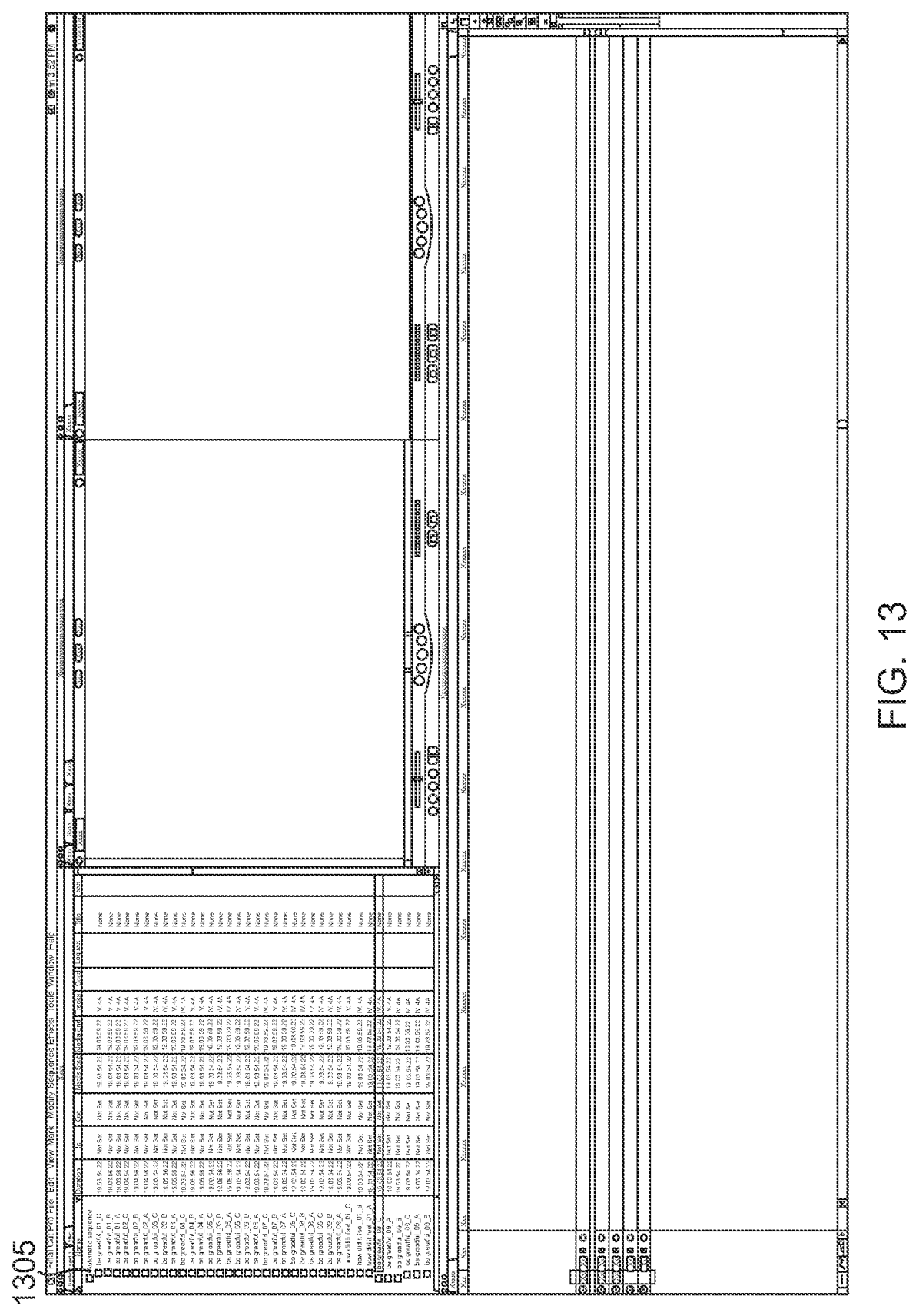

After 240, the process displays one or more multiclips on one or more video tracks of in the GUI of the video editing application. In the GUI examples illustrate in FIGS. 7-12, this operation is initiated when the video editor selects the OK button 750 in the multiclip list that is presented to the video editor. This selection causes the video editing application to create a multiclip folder 1305 in the browser window 130, and to import the set of video clips selected for multiclip grouping into the this folder 1305, as shown in FIG. 13.

In some embodiments, the multiclip list (such as the ones illustrated in FIGS. 7-12) includes a check box 755 that when checked indicates that the listed multiclips should be placed in a multiclip sequence. This box is checked by default in some embodiments. If the video editor does not remove this check, the process 200 specifies (at 245) a multiclip sequence that includes all the created multiclips. In addition to the multiclips in the browser window 130, the process 200 also places (at 245) an entry for this multiclip sequence in the browser window 130, as shown in FIG. 13.

Figure 14:
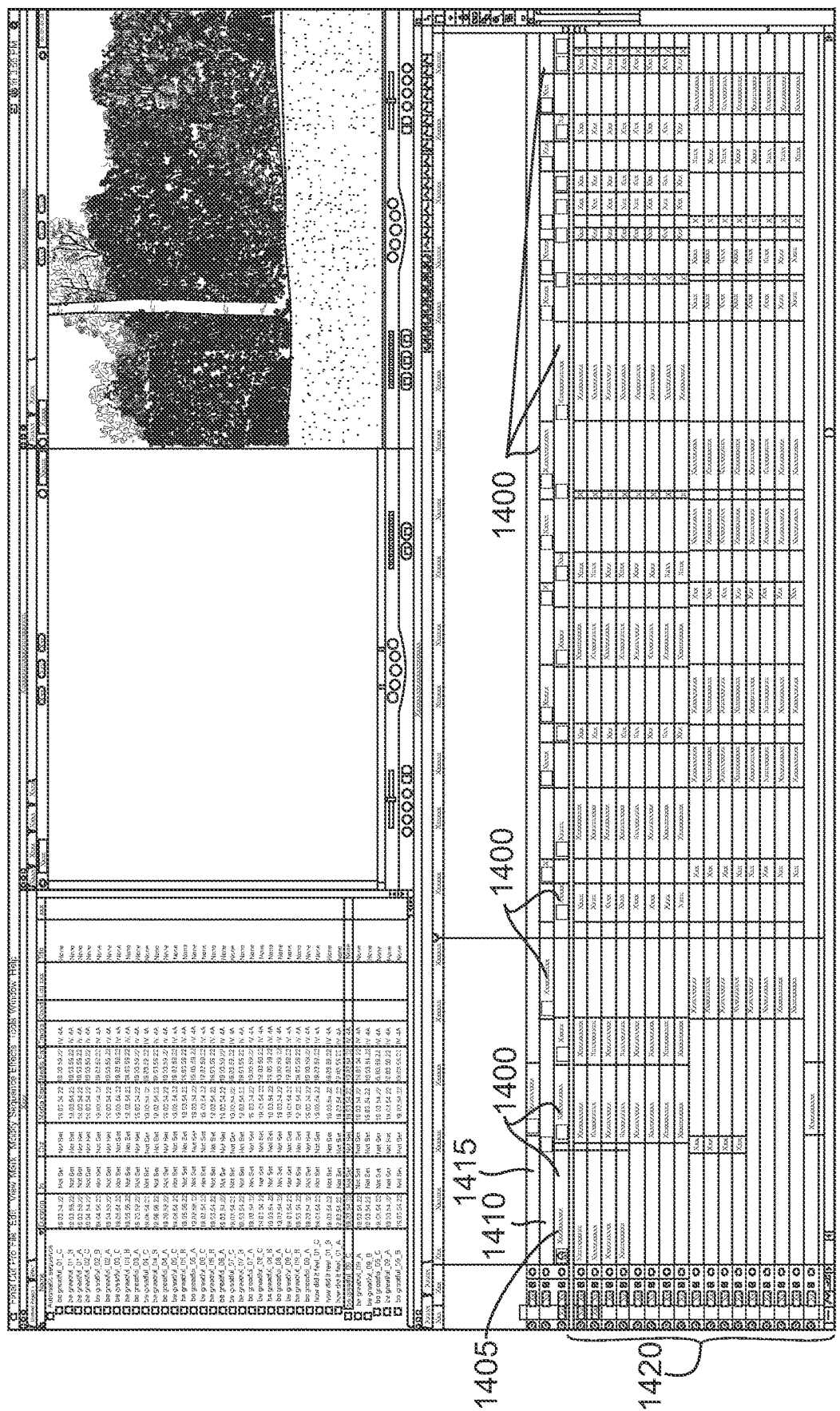
FIG. 14 illustrates a video editing application displaying a multiclip sequence to the editor by presenting multiclips along one or more video and audio tracks.

When the editor selects the entry for the multiclip sequence (e.g., by double clicking this entry), the video editing application displays the multiclip sequence to the editor by presenting all of its multiclips along one or more video and audio tracks, as shown in FIG. 14. This figure illustrates thirty-one multiclips 1400, where each multiclip is represented by a rectangular box on one of three video tracks 1405, 1410, and 1415. The audio tracks associated with each multiclip is illustrated as a rectangular box below the rectangular box of the multiclip on an audio track 1420.

After 245, the process allows (at 250) the video editor to generate the composite video clip by editing the multiclip sequence with the multiclips defined at 245. As further described below, the video editor can easily generate the composite video clip by selecting (through simple GUI operations) different parts of the clips in the same or different multiclips to be different parts of the composite video clip. In some embodiments, these selections cause the video editing application to generate one or more multiclips during this editing process, as further described below.

Figure 15:
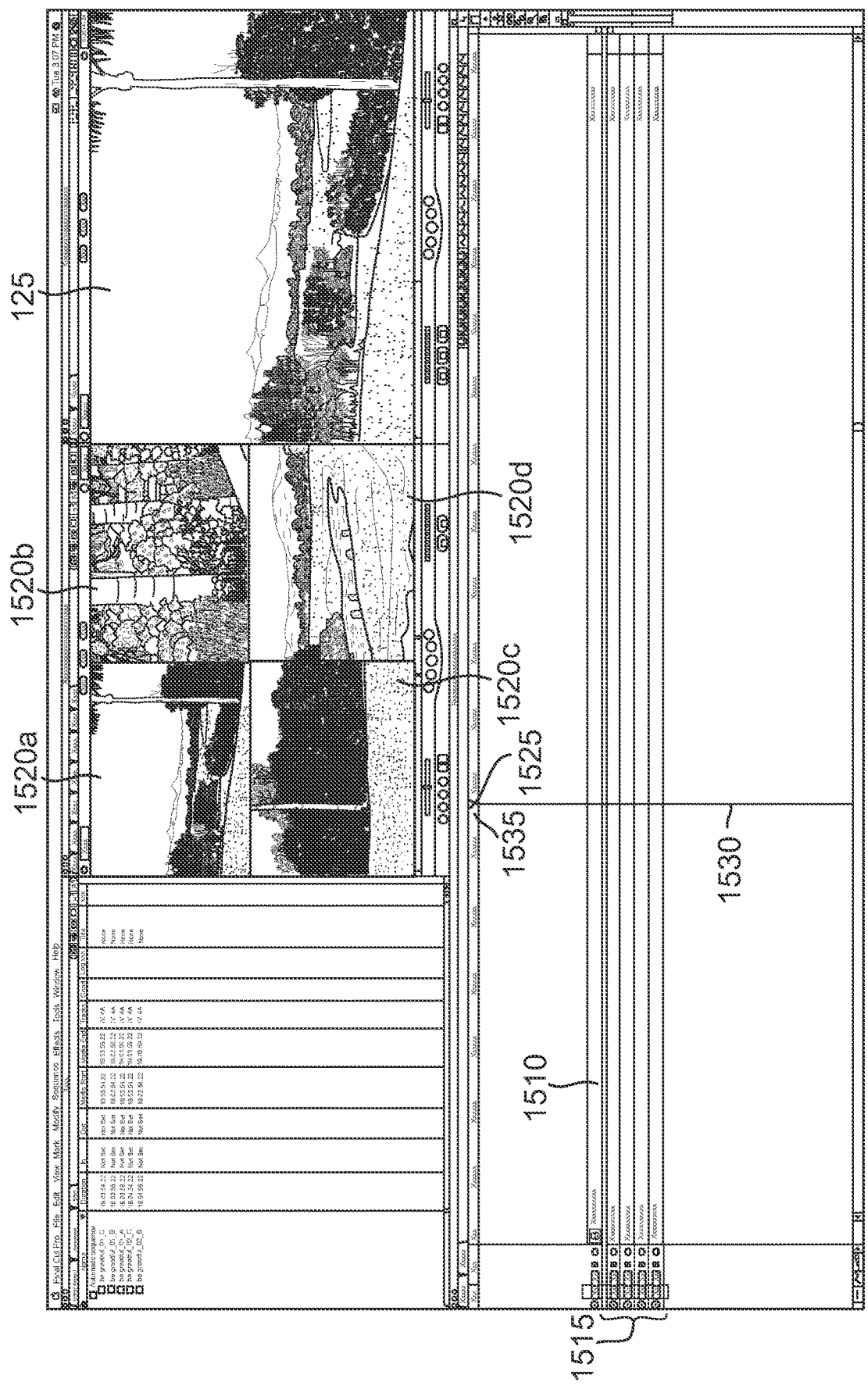
FIG. 15 illustrates a video editing application's GUI after a multiclip has been defined on the first video track.

FIGS. 15-19 present several examples of the video editing application's GUI after the creation of a multiclip sequence. Specifically, FIG. 15 illustrates the application's GUI after a multiclip 1510 has been defined on the first video track 110. This multiclip has four associated audio tracks 1515.

FIG. 15 also illustrates a time marker 1525 and its associated time-marker line 1530, which scroll across the playback time line 105 during playback. The intersection of the time-marker line with a video clip or an audio clip identifies an image (e.g., a frame) in the video clip or a sample in the audio clip that is in the clip at the particular time specified by the position of the time marker on the timeline. For instance, in FIG. 15, the time marker is at time 1535. At time 1535, the multiclip 1510 has four video clips with video content. The frames in these video clips at time 1535 are illustrated in display sections 1520a-1520c of the multiclip display window 120.

In some embodiments, each multiclip has only one active video clip. This active video clip is illustrated within the composite video preview window 125. For instance, in FIG. 15, the active video clip is the first video clip, which is also displayed in multiclip display section 1520a of FIG. 15.

Some embodiments allow the video editor to change the video clip that forms the video composite at any time in the timeline that has one or more video clips of one or more multiclips associated with it, by simply selecting (e.g., clicking) a video clip that is playing in one of the multiclip display sections. For instance, in the example illustrated in FIG. 15, the video editor can change the video clip that forms the composite video at time 1535 by clicking on the multiclip display section 1520b. This clicking causes the video composite starting at time 1535 to be the portion of the multiclip's second video clip that starts at time 1535, where the second video clip is the clip that is displayed in section 1520b. The video composite before time 1535, however, still includes the portion of the multiclip's first video clip that is before time 1535.

Figure 16:
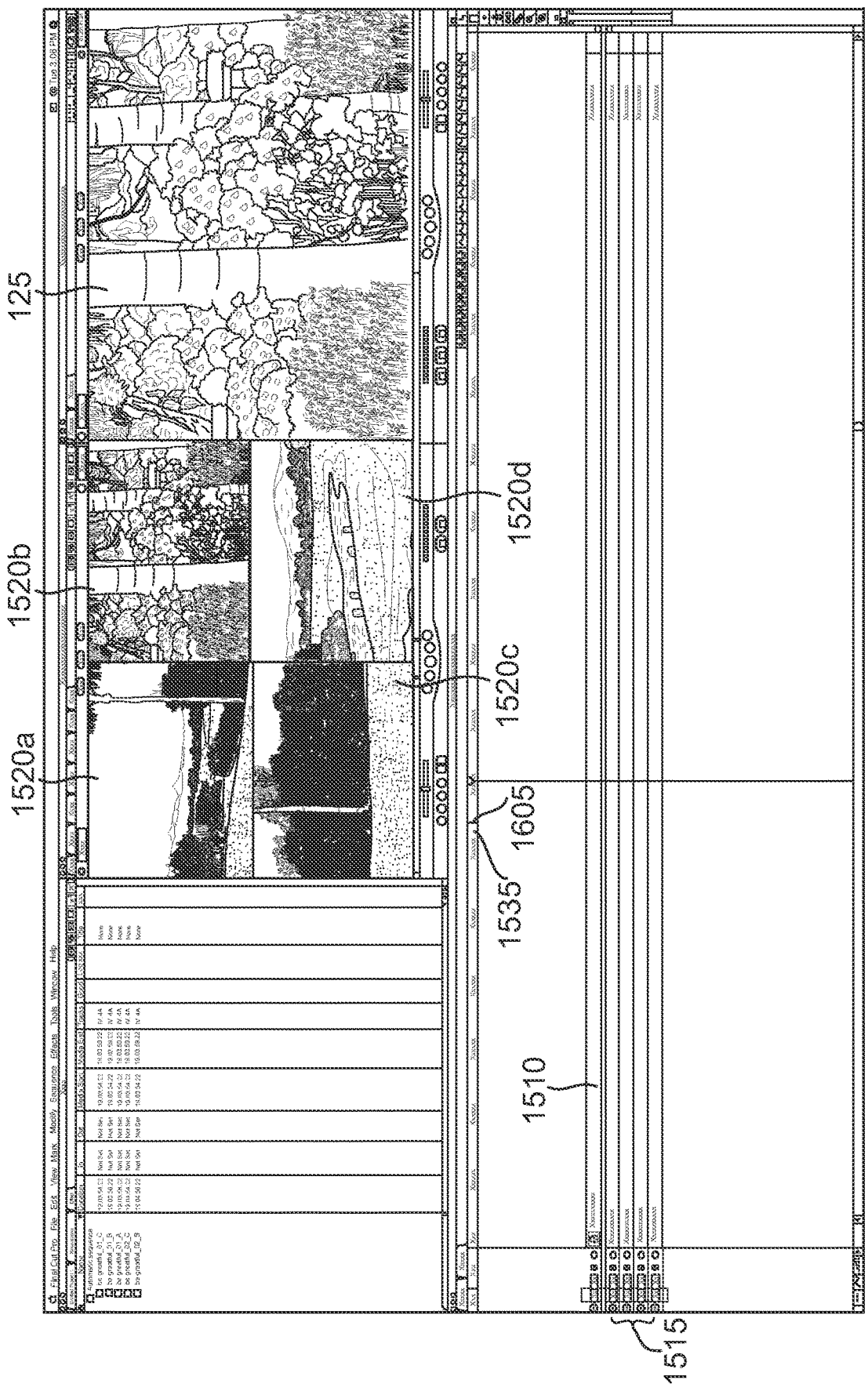
FIG. 16 illustrates changing between the first and second video clips of a multiclip.

FIG. 16 illustrates changing between the first and second video clips of the multiclip 1510 at time 1535. Specifically, it displays the second video clip in the composite video preview window 125 at a time after time 1535. It also illustrates a colored marker 1605 in the time line 105 at time 1535. This marker is added when the video editor switches between two different video clips of the same or different multiclips during playback (i.e., while the time marker is scrolling across the timeline 105). This marker indicates the time that the switch between two clips happens during playback. In some embodiments, once the editor stops the playback, the video editing application breaks any multiclip that has one or more markers 1605 during its duration into two or more multiclips at the location of the marker or markers. It then defines the active video clip of each multiclip to be the video clip that is part of the composite video starting at the start time of the multiclip.

Figure 17:
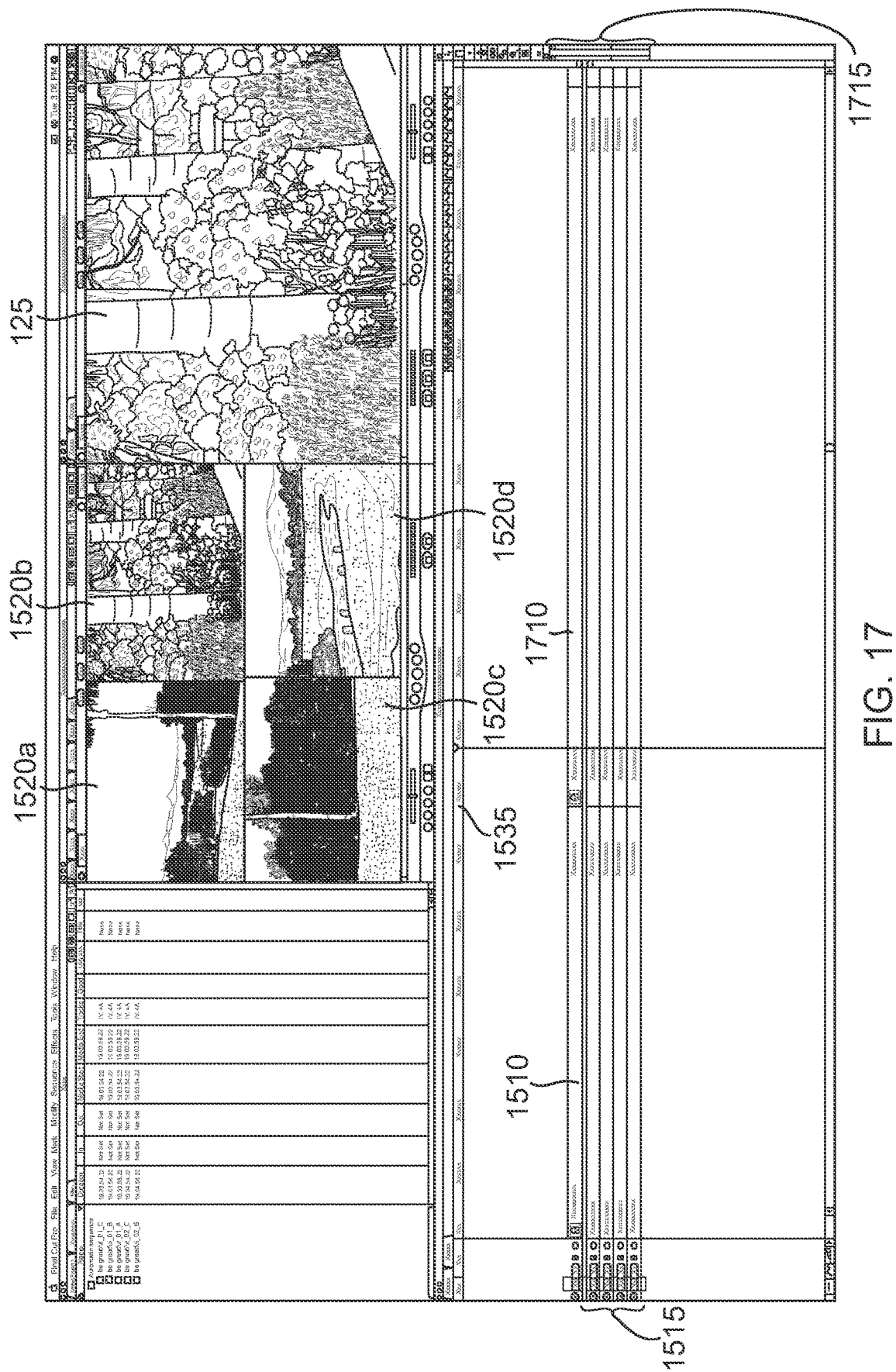
FIG. 17 illustrates an example of breaking a multiclip into two multiclips.

FIG. 17 illustrates an example of breaking the multiclip 1510 into two multiclips 1510 and 1710, where the multiclip 1510 terminates at time 1535 and the multiclip 1710 starts at time 1535. As shown in this figure, the composite video preview window displays the second video clip during the duration of the second multiclip 1710.

Figure 18:
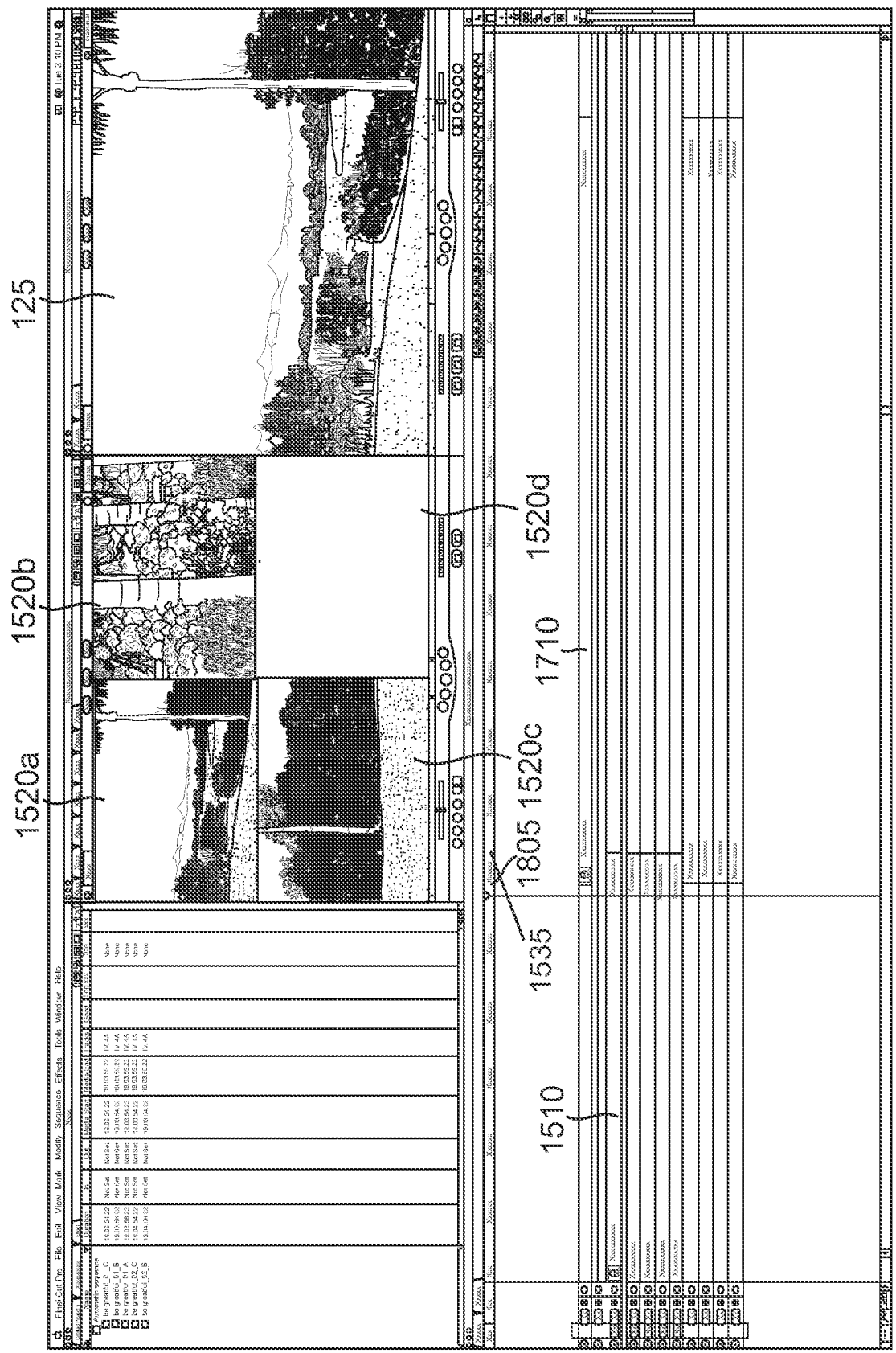
FIG. 18 illustrates the multiclips overlapping after the user has dragged a multiclip backwards in time into the last portion of the other multiclip.

Two multiclips may overlap by default or through some action of the video editor (e.g., the video editor might drag one multiclip into the same time period as another multiclip). For instance, FIG. 18 illustrates the multiclips 1510 and 1710 overlapping after the user has dragged multiclip 1710 backwards in time into the last portion of the multiclip 1510. As shown in this figure, this overlap results in multiclip 1710 being assigned to another video track.

Figure 19:
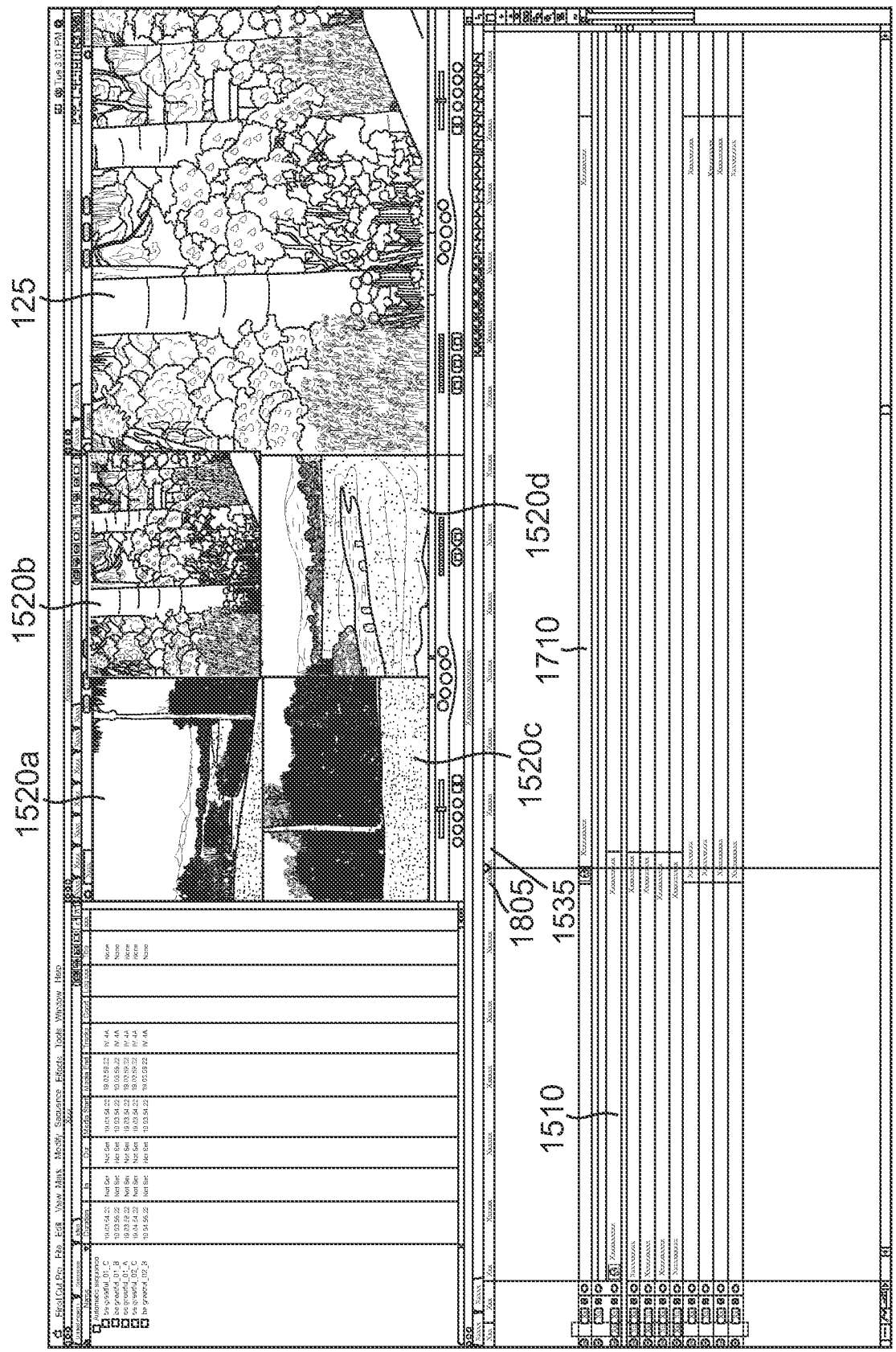
FIG. 19 shows the video composite being the active video clip of the other multiclip after they overlap.

In some embodiments, each multiclip is viewed as an opaque object, which blocks out each multiclip that is below it. Also, in some embodiments, each subsequent video track is in front of each video track that preceded it in the video track order, e.g., video track 2 is in front of video track 1, video track 3 is in front of video track 2, and so on. Hence, when two multiclips overlap, the video editing application in some embodiments defaults to the multiclip that is on a higher track number in some embodiments. This is shown in FIGS. 18 and 19. Specifically, FIG. 18 shows the video composite being the active video clip (i.e., the video clip 1) of the multiclip 1510 before time 1805 when the two multiclips overlap, while FIG. 19 shows the video composite being the active video clip (i.e., the video clip 2) of the multiclip 1710 after time 1805.

When two multiclips overlap, the video editor can change the content of the composite video from one multiclip to another. In some embodiments, the video editor simply drags the desired multiclip from the lower track to the higher track that contains the multiclip that is obscuring it. Alternatively, the video editor can disable the track that is obscuring the desired multiclip by clicking a track enable button that is to the left of the track, in some embodiments.

IV. Data Structures for Clip, Multiclip and Multiclip Sequence

Some embodiments have three classes of objects to define a multiclip sequence. These three types are a clip class, a multiclip class, and a multi-sequence class. A clip class can be used to define a clip object, which is a container for containing temporal, spatial, format, and file information that can be used to specify data within a multimedia application. While much of the data contained in the clip can come directly from interpreting the file embedded in the clip, other information can be altered and specified by the user, such as additional effect processing, marked portions to be used for editing, and other various descriptive data that alters its interpretation within the multimedia application. A clip can hold video or audio information, or both in the more common case.

The following is pseudo code for a clip object, which defines its data attributes.

```
ClipObject
{
    fileinfo file {
        int width;
        int height;
        videoinfo video {
            double duration;
            int width;
```

```
            int height;
            compressioninfo compression {
                int compressionType;
                int vendor;
                int spatialQuality;
                int samplesWidth;
                int samplesHeight;
            }
        }
        timecodedata tcData {
            int framebase;
            bool ntsc;
            int numFrames;
        }
    }
    double in;
    double out
    double start;
    double end;
    double duration;
    int framebase;
    bool ntscrate;
    trackinfo itemspec {
        int tracktype;
        int trackindex;
        int itemindex;
        int itemgroup;
    }
}
```

A multiclip is a type of clip, i.e., the multiclip class inherits from the clip class. A multiclip serves as a container of clips that are grouped together in a logical manner based on user defined temporal specification. This specification can be one of several different time points that are used to arrange the clips within the container such that they align themselves with one another synchronized at the temporal point specified by the user. This can be a manually set point in time, or as is the case with making a multiclip sequence, source timecode. The clips themselves are contained in an angles object, which is essentially just an stl map of a custom type. A multiclip can have as few as 1 clip and as many as 128 clips contained within its data structure. Of those 128, as few as 1 and as many as 16 can be visible/viewed at any given moment in the Viewer.

The following is pseudo code for a multiclip object, which defines its data attributes.

```
MulticlipObject
{
    long m_sVersionNumber;
    long m_sMaxAngles;
    long m_sMinAngles;
    long angleCount;
    long mActiveVidAngle;
    long mActiveAudAngle;
    long mSyncType;
    bool mCollapsed;
    long mVisIndex;
    long mFlags;
    AnglesArray mAngles {
        ClipObjects clips;
    }
}
```

A multiclip sequence is a spatio-temporal collection of clip objects (i.e., media) that can be arranged by user interaction, or as is the case in making a multiclip sequence, automatically based on their temporal attributes. A sequence generally contains several attributes that describe its video and audio format, frame-rate, and other characteristics for determining image-processing quality. The sequence contains a starting timecode value, which, in the case of making a multiclip sequence is set to match the earliest starting timecode found in the set of all multiclips that will be automatically edited into the sequence. In addition, the format specifications of the sequence created in this case is also specified to match the format of the multiclips that are to be automatically edited into the sequence.

The following is pseudo code for a multiclip sequence object, which defines its data attributes.

```
SequenceObject
{
    double in;
    double out;
    double duration;
    int tcbase;
    int framebase;
    bool ntscrate;
    mediainfo media {
        ClipObjects;
        MulticlipObjects;
    }
    sequenceproperties seqProps {
        codecinfo codec {
            int cType;
            int vendor;
        }
        int spatialQuality;
        int depth;
        int framebase;
        bool ntscrate;
        int temporalQuality;
        float sampleRate;
        int width;
        int height;
        int pAspectRatio;
        bool anamorphic;
        int fieldDominance;
    }
        timecodedata tcData {
            timecodetrackinfo tcTracks {
                int trackType;
                int framebase;
                bool ntsc;
                int numFrames;
            }
        }
}
```

V. Computer System

FIG. 20 presents a computer system with which one embodiment of the invention is implemented. Computer system 2000 includes a bus 2005, a processor 2010, a system memory 2015, a read-only memory 2020, a permanent storage device 2025, input devices 2030, and output devices 2035. The bus 2005 collectively represents all system, peripheral, and chipset buses that communicatively connect the numerous internal devices of the computer system 2000. For instance, the bus 2005 communicatively connects the processor 2010 with the read-only memory 2020, the system memory 2015, and the permanent storage device 2025.

From these various memory units, the processor 2010 retrieves instructions to execute and data to process in order to execute the processes of the invention. The read-only-memory (ROM) 2020 stores static data and instructions that are needed by the processor 2010 and other modules of the computer system.

The permanent storage device 2025, on the other hand, is read-and-write memory device. This device is a non-volatile memory unit that stores instruction and data even when the computer system 2000 is off. Some embodiments of the invention use a mass-storage device (such as a magnetic or optical disk and its corresponding disk drive) as the permanent storage device 2025.

Other embodiments use a removable storage device (such as a floppy disk or Zip® disk, and its corresponding disk drive) as the permanent storage device. Like the permanent storage device 2025, the system memory 2015 is a read-and-write memory device. However, unlike storage device 2025, the system memory is a volatile read-and-write memory, such as a random access memory. The system memory stores some of the instructions and data that the processor needs at runtime. In some embodiments, the invention's processes are stored in the system memory 2015, the permanent storage device 2025, and/or the read-only memory 2020.

The bus 2005 also connects to the input and output devices 2030 and 2035. The input devices enable the user to communicate information and select commands to the computer system. The input devices 2030 include alphanumeric keyboards and cursor-controllers. The output devices 2035 display images generated by the computer system. For instance, these devices display the GUI of a video editing application that incorporates the invention. The output devices include printers and display devices, such as cathode ray tubes (CRT) or liquid crystal displays (LCD).

Finally, as shown in FIG. 20, bus 2005 also couples computer 2000 to a network 2065 through a network adapter (not shown). In this manner, the computer can be a part of a network of computers (such as a local area network ("LAN"), a wide area network ("WAN"), or an Intranet) or a network of networks (such as the Internet). Any or all of the components of computer system 2000 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method comprising:
    determining, for each video clip of a set of video clips, a time period and a location where the video clip was captured;
    receiving a minimum percentage of temporal overlap, wherein the minimum percentage of temporal overlap is non-zero;
    determining, for each video clip of the set of video clips, an amount of temporal overlap with other video clips of the set of video clips based on the time period for each video clip;
    defining a plurality of multiclips from the set of video clips based on the location and the amount of temporal overlap for each video clip of the set of video clips, each multiclip representing a plurality of video clips that are captured from one event at a same location by multiple cameras, each video clip in a multiclip having at least the minimum percentage of temporal overlap with one or more other video clips in a same multiclip;
    displaying each multiclip as a single geometric shape on a different video track of a composite display area that spans along a timeline;
    receiving a plurality of different selections of video clips of the plurality of multiclips to be part of a composite presentation at a plurality of different instances in time,
    wherein at any instance in time only one video clip of one multiclip is part of the composite presentation; and
    displaying a preview of the composite presentation on a preview display area.

2. The method of claim 1, wherein defining the plurality of multiclips further comprises:
    receiving an adjustment to the minimum percentage of temporal overlap; and
    analyzing the set of video clips to identify the plurality of video clips that are to be associated with the plurality of multiclips based on the adjusted minimum percentage of temporal overlap.

3. The method of claim 1 further comprising concurrently playing a plurality of video clips of a first multiclip in a plurality of selectable display areas, wherein receiving a plurality of different selections of a plurality of different video clips comprises receiving a selection of a particular selectable display area.

4. The method of claim 1, wherein a first multiclip blocks a display of video clips of other multiclips based on a position of a video track of the composite display area displaying the first multiclip in relation to video tracks displaying the other multiclips in the plurality of multiclips.

5. The method of claim 1, wherein when a first geometric shape corresponding to a first multiclip overlaps a second geometric shape corresponding to a second multiclip on the timeline and the second geometric shape is placed in a lower video track than a video track with the first geometric shape, the first multiclip is given priority over the second multiclip during a playback of the composite presentation.

6. The method of claim 5, wherein when a time marker scrolls along a portion of the timeline that includes the overlapped first and second multiclips, one video clip of the first multiclip is played in the preview display area and video clips of the second multiclip are not played in the preview display area.

7. The method of claim 1, further comprising:
    concurrently playing a first plurality of video clips of a first multiclip in a plurality of selectable display areas; and
    displaying a time marker for scrolling along the timeline to represent time during a playback of the composite presentation,
    wherein the first plurality of video clips of the first multiclip are played prior to a second plurality of video clips of a second multiclip when the time marker scrolls across the timeline from the first multiclip to the second multiclip.

8. The method of claim 1, further comprising:
    receiving a selection of a first video clip of a first multiclip to be part of the composite presentation;
    receiving a selection of a second video clip of the first multiclip to be part of the composite presentation prior to a completion of the first video clip; and
    placing a marker at a time instance on the timeline where the second video clip is selected.

9. The method of claim 8, further comprising automatically splitting the first multiclip into a pair of multiclips at the time instance identified by the marker after stopping the display of the preview of the composite presentation.

10. The method of claim 1, further comprising:
    concurrently playing a plurality of video clips of a first multiclip in a plurality of selectable display areas;
    receiving a selection of a second multiclip; and
    concurrently playing a plurality of video clips of the second multiclip in a plurality of selectable display areas, wherein receiving a plurality of different selections of a plurality of different video clips of the plurality of multiclips comprises receiving a selection of at least one video clip of the first multiclip at a first instant of time and receiving a selection of at least one video clip of the second multiclip at a second instant of time.

11. A non-transitory computer readable medium storing an application for defining a composite video presentation, the application executable by a processor, the application comprising sets of instructions for:
   determining, for each video clip of a set of video clips, a time period and a location where the video clip was captured;
   receiving a minimum percentage of temporal overlap, wherein the minimum percentage of temporal overlap is non-zero;
   determining, for each video clip of the set of video clips, an amount of temporal overlap with other video clips of the set of video clips based on the time period for each video clip;
   defining a plurality of multiclips from the set of video clips based on the location and the amount of temporal overlap for each video clip of the set of video clips, each multiclip for representing a plurality of video clips as video clips that are captured from one event at a same location by multiple cameras, each video clip in a multiclip having at least the minimum percentage of temporal overlap with other video clips in the multiclip;
   displaying each multiclip as a single geometric shape on a different video track of a composite display area that spans along a timeline;
   at a plurality of different instances in time, receiving a plurality of different selections of a plurality of different video clips of the plurality of multiclips to be part of the composite presentation, wherein at any instance in time only one video clip of one multiclip is part of the composite presentation; and
   displaying a preview of the composite presentation on a preview display area the display area.

12. The non-transitory computer readable medium of claim 11, wherein the set of instructions for defining the plurality of multiclips comprises sets of instructions for:
   receiving an adjustment to the minimum percentage of temporal overlap; and
   analyzing the set of video clips to identify the plurality of video clips that are to be associated with the plurality of multiclips based on the adjusted minimum percentage of temporal overlap.

13. The non-transitory computer readable medium of claim 11, the application further comprising a set of instructions for concurrently playing a plurality of video clips of a first multiclip in a plurality of selectable display areas, wherein the set of instructions for receiving a plurality of different selections of a plurality of different video clips comprises a set of instructions for receiving a selection of a particular selectable display area.

14. The non-transitory computer readable medium of claim 11, wherein a first multiclip blocks a display of video clips of other multiclips based on a position of a video track of the composite display area displaying the first multiclip in relation to video tracks displaying the other multiclips in the plurality of multiclips.

15. The non-transitory computer readable medium of claim 11, wherein when a first geometric shape corresponding to a first multiclip overlaps a second geometric shape corresponding to a second multiclip on the timeline and the second geometric shape is placed in a lower video track than a video track with the first geometric shape, the first multiclip is given priority over the second multiclip during a playback of the composite presentation.

16. The non-transitory computer readable medium of claim 15, wherein when a time marker scrolls along a portion of the timeline that includes the overlapped first and second multiclips, one video clip of the first multiclip is played in the preview display area and video clips of the second multiclip are not played in the preview display area.

17. The non-transitory computer readable medium of claim 11, the application further comprising sets of instructions for:
   concurrently playing a first plurality of video clips of a first multiclip in a plurality of selectable display areas; and
   displaying a time marker for scrolling along the timeline to represent time during a playback of the composite presentation,
   wherein the first plurality of video clips of the first multiclip are played prior to a second plurality of video clips of a second multiclip when the time marker scrolls across the timeline from the first multiclip to the second multiclip.

18. The non-transitory computer readable medium of claim 11, the application further comprising sets of instructions for:
   receiving a selection of a first video clip of a first multiclip to be part of the composite presentation;
   receiving a selection of a second video clip of the first multiclip to be part of the composite presentation prior to a completion of the first video clip; and
   placing a marker at a time instance on the timeline where the second video clip is selected.

19. The non-transitory computer readable medium of claim 18, the application further comprising sets of instructions for automatically splitting the first multiclip into a pair of multiclips at the time instance identified by the marker after stopping the display of the preview of the composite presentation.

20. The non-transitory computer readable medium of claim 11, the application further comprising sets of instructions for:
   concurrently playing a plurality of video clips of a first multiclip in a plurality of selectable display areas;
   receiving a selection of a second multiclip; and
   concurrently playing a plurality of video clips of the second multiclip in a plurality of selectable display areas,
   wherein the set of instructions for receiving a plurality of different selections of a plurality of different video clips of the plurality of multiclips comprises a set of instructions for receiving a selection of at least one video clip of the first multiclip at a first instant of time and receiving a selection of at least one video clip of the second multiclip at a second instant of time.

21. A method comprising:
   defining a plurality of multiclips, comprising:
      analyzing a plurality of video clips to determine, for each video clip of the plurality of video clips, a time period and a location where the video clip was captured;
      determining, for each video clip of the set of video clips, an amount of temporal overlap with other video clips of the set of video clips based on the time period for each video clip; and
      identifying sets of video clips to associate together as multiclips based on: (a) each video clip in a particular multiclip being captured from one event at a same location by multiple cameras based on the location of each video clip, and (b) each video clip in a particular multiclip having at least a minimum percentage of temporal overlap with other video clips in the particular multiclip, wherein the minimum percentage of temporal overlap is non-zero;

displaying each multiclip as a single geometric shape on a different video track of a composite display area that spans along a timeline;

receiving an adjustment to the minimum percentage of temporal overlap;

analyzing the plurality of video clips to identify the sets of video clips that are to be associated with the plurality of multiclips based on the adjusted minimum percentage of temporal overlap;

receiving a plurality of different selections of video clips of the plurality of multiclips to form a composite presentation at a plurality of different instances in time, wherein only one video clip of one multiclip is part of the composite presentation at any instance in time; and displaying a preview of the composite presentation on a preview display area.

\* \* \* \* \*